(12) United States Patent
Takahama

(10) Patent No.: US 10,740,878 B2
(45) Date of Patent: Aug. 11, 2020

(54) IMAGE PROCESSING APPARATUS, IMAGE PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Atsushi Takahama, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 66 days.

(21) Appl. No.: 16/199,554

(22) Filed: Nov. 26, 2018

(65) Prior Publication Data

US 2019/0164258 A1 May 30, 2019

(30) Foreign Application Priority Data

Nov. 27, 2017 (JP) .................................. 2017-227047

(51) Int. Cl.
| | | |
|---|---|---|
| *G06T 5/00* | (2006.01) | |
| *G06T 5/20* | (2006.01) | |
| *H04N 1/60* | (2006.01) | |
| *G06F 17/11* | (2006.01) | |
| *H04N 1/409* | (2006.01) | |
| *H04N 1/58* | (2006.01) | |

(52) U.S. Cl.
CPC .............. *G06T 5/002* (2013.01); *G06F 17/11* (2013.01); *G06T 5/20* (2013.01); *H04N 1/409* (2013.01); *H04N 1/58* (2013.01); *H04N 1/603* (2013.01); *H04N 1/6027* (2013.01); *G06T 2207/20076* (2013.01)

(58) Field of Classification Search
None
See application file for complete search history.

(56) References Cited

U.S. PATENT DOCUMENTS 9,911,060 B2   3/2018   Takahama

OTHER PUBLICATIONS

Lebrun, M. et al., "A Nonlocal Bayesian Image Denoising Algorithm," SIAM Journal on Imaging Science, Sep. 2013, vol. 6, No. 3, pp. 1665-1688.
Lebrun, M. et al., "Implementation of the 'Non-Local Bayes' (NL-Bayes) Image Denoising Algorithm," Image Processing on Line, Jun. 2013, No. 3, pp. 1-42.

*Primary Examiner* — David Perlman
(74) *Attorney, Agent, or Firm* — Carter, DeLuca & Farrell LLP

(57) ABSTRACT

A set of patches including a patch of interest formed of pixels relative to a pixel of interest and a similar patch thereof is acquired. A noise amount parameter corresponding to each pixel in the patch of interest is estimated based on a pixel value of the each pixel in the patch of interest. A covariance matrix corresponding to the set of patches on the assumption that each pixel has a uniform noise amount parameter is calculated based on the set of patches. Based on the covariance matrix and the noise amount parameter, a covariance matrix corresponding to the noise amount parameter of the each pixel is estimated. Using the estimated covariance matrix, a patch in which noise of at least the patch of interest among the patches included in the set of patches is reduced is generated.

21 Claims, 14 Drawing Sheets

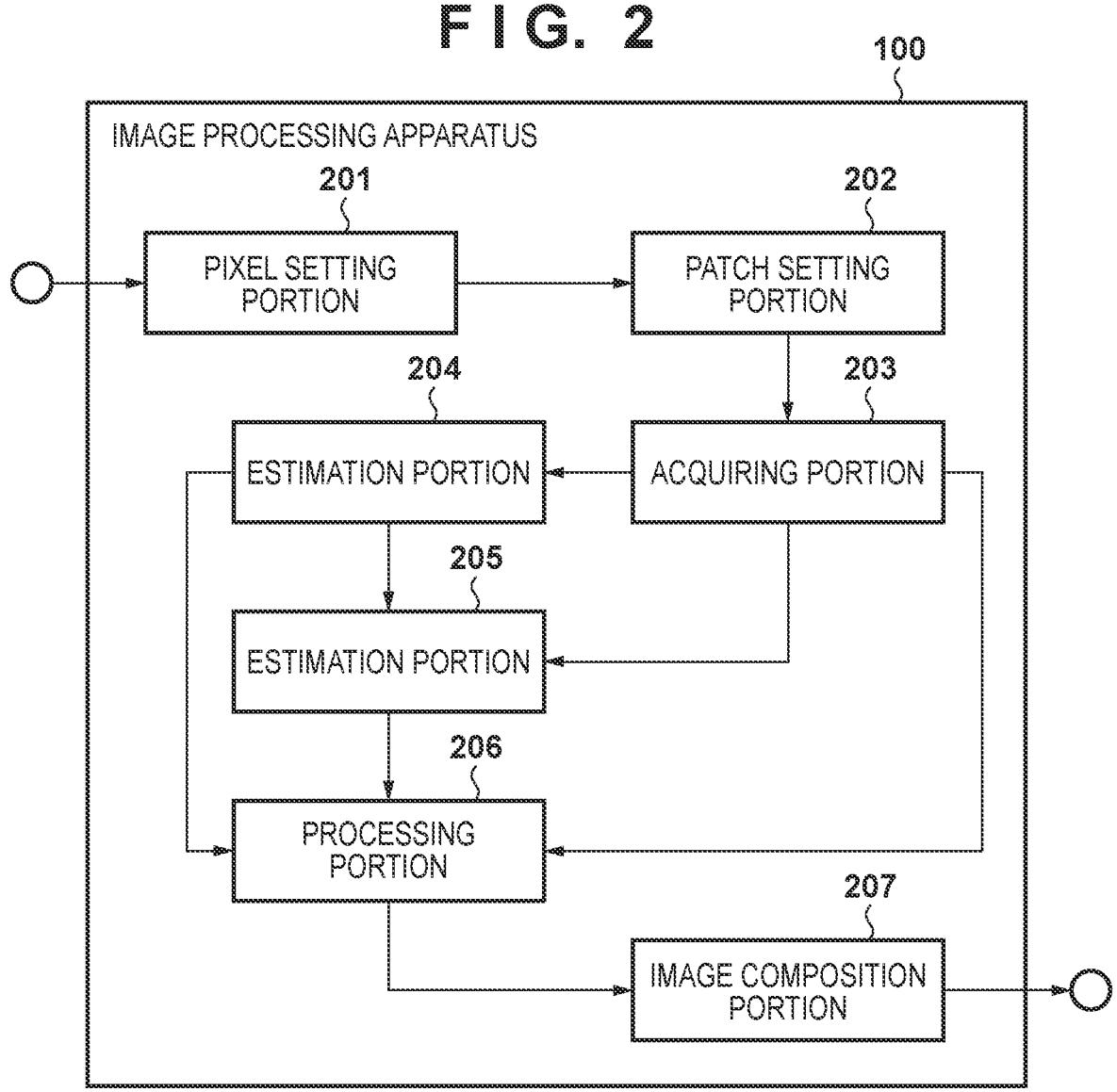
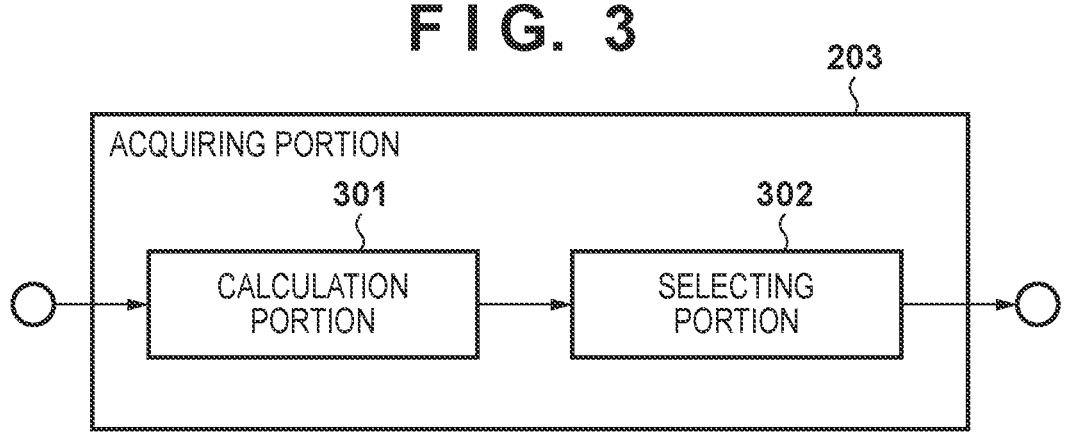

FIG. 6

PATCH SIZE: IF 3×3

```
1 2 3
4 5 6
7 8 9
```

```
5 6 7
8 9 1
2 3 4
```

⋮

```
2 3 4
5 6 7
8 9 1
```

N PATCHES

PATCH EXPRESSED BY ONE DIMENSIONAL VECTOR

| 1 | 5 | | 2 |
|---|---|---|---|
| 2 | 6 | | 3 |
| 3 | 7 | | 4 |
| 4 | 8 | | 5 |
| 5 | 9 | ... | 6 |
| 6 | 1 | | 7 |
| 7 | 2 | | 7 |
| 8 | 3 | | 8 |
| 9 | 4 | | 9 |

N PATCHES

IMAGE PROCESSING APPARATUS, IMAGE PROCESSING METHOD, AND NON-TRANSITORY COMPUTER-READABLE STORAGE MEDIUM

BACKGROUND OF THE INVENTION

Field of the Invention

The present invention relates to a technique for reducing noise in an image.

Description of the Related Art

A digital image capturing device such as a digital camera generates digital image data by converting light received by a photocharge conversion element (imaging device) such as a CCD or CMOS sensor to a digital signal. During the process of generating digital image data, due to the characteristics of the imaging device or circuits, dark current noise, thermal noise, shot noise, and the like occur, as a result of which the noise occurs in the digital image data. Noise is becoming more noticeable because of extreme reductions in pixel pitch following the recent trend toward smaller imaging devices and higher resolution, and the occurrence of noise is pronounced particularly when the capturing sensitivity is high, which is a significant factor in image quality degradation. Accordingly, in order to obtain a high quality image, it is necessary to reduce noise in the digital image data, and many noise reduction techniques are known.

Among the known noise reduction techniques, A Non-local Bayesian image denoising algorithm, SIAM Journal on Imaging Science, 2013, Implementation of the "Non-Local Bayes" (NL-Bayes) Image Denoising Algorithm, Image Processing On Line, 3 (2013) (NL Bayes method) discloses a technique in which a set of patches is generated from a captured image, and a noise reduction process is performed on all of the patches belonging to the set of patches, and then the patches are composited so as to generate a denoised image. With the technique (NL Bayes method) disclosed in A Non-local Bayesian image denoising algorithm, SIAM Journal on Imaging Science, 2013, Implementation of the "Non-Local Bayes" (NL-Bayes) Image Denoising Algorithm, Image Processing On Line, 3 (2013), only noise can be highly accurately reduced without blurring the edges and the texture. However, this technique is based on the assumption that the amount of noise included in each pixel in an input image is the same. That is, the grayscale image is assumed to refer to an image in which all pixels have the same level of noise, and the RGB image, which has color information regarding three colors (RGB), is assumed to refer to an image in which all pixels have the same amount of noise for each piece of RGB information.

In the imaging device included in a digital image capturing device, because noise occurs in an amount depending on the amount of incident light, in image data generated by the digital image capturing device when capturing an image of an ordinary subject, the amount of noise in each pixel is not uniform. Accordingly, even if the technique disclosed in A Non-local Bayesian image denoising algorithm, SIAM Journal on Imaging Science, 2013, Implementation of the "Non-Local Bayes" (NL-Bayes) Image Denoising Algorithm, Image Processing On Line, 3 (2013) is directly applied to the image data generated by the digital image capturing device, it is not possible to highly accurately reduce noise.

SUMMARY OF THE INVENTION

The present invention has been made in view of the problem described above, and the present invention provides a technique for implementing highly accurate noise reduction even in an image in which the amount of noise included in each pixel is not uniform.

According to the first aspect of the present invention, there is provided an image processing apparatus comprising: an acquiring unit that acquires a set of patches that includes a patch of interest formed of a plurality of pixels relative to a pixel of interest and a similar patch that is similar to the patch of interest in an input image; a first estimation unit that estimates a noise amount parameter that corresponds to each pixel in the patch of interest based on a pixel value of each pixel in the patch of interest; a first calculation unit that calculates, based on the set of patches, a covariance matrix that corresponds to the set of patches on the assumption that each pixel has a uniform noise amount parameter; a second estimation unit that estimates, based on the covariance matrix and the noise amount parameter, a covariance matrix that corresponds to the noise amount parameter of each pixel; and a processing unit that executes, using the covariance matrix estimated by the second estimation unit, a process of generating a first patch in which noise of at least the patch of interest among the patches included in the set of patches is reduced.

According to the second aspect of the present invention, there is provided an image processing method comprising: acquiring a set of patches that includes a patch of interest formed of a plurality of pixels relative to a pixel of interest and a similar patch that is similar to the patch of interest in an input image; estimating a noise amount parameter that corresponds to each pixel in the patch of interest based on a pixel value of the each pixel in the patch of interest; calculating, based on the set of patches, a covariance matrix that corresponds to the set of patches on the assumption that each pixel has a uniform noise amount parameter; estimating, based on the covariance matrix and the noise amount parameter, a covariance matrix that corresponds to the noise amount parameter of the each pixel; and executing, using the estimated covariance matrix, a process of generating a first patch in which noise of at least the patch of interest among the patches included in the set of patches is reduced.

According to the third aspect of the present invention, there is provided a non-transitory computer-readable storage medium storing a computer program for causing a computer to function as: an acquiring unit that acquires a set of patches that includes a patch of interest formed of a plurality of pixels relative to a pixel of interest and a similar patch that is similar to the patch of interest in an input image; a first estimation unit that estimates a noise amount parameter that corresponds to each pixel in the patch of interest based on a pixel value of each pixel in the patch of interest; a first calculation unit that calculates, based on the set of patches, a covariance matrix that corresponds to the set of patches on the assumption that each pixel has a uniform noise amount parameter; a second estimation unit that estimates, based on the covariance matrix and the noise amount parameter, a covariance matrix that corresponds to the noise amount parameter of each pixel; and a processing unit that executes, using the covariance matrix estimated by the second estimation unit, a process of generating a first patch in which noise of at least the patch of interest among the patches included in the set of patches is reduced.

Further features of the present invention will become apparent from the following description of exemplary embodiments (with reference to the attached drawings).

BRIEF DESCRIPTION OF THE DRAWINGS

FIG. 2 is a block diagram showing an example of a functional configuration of the image processing apparatus 100.

FIG. 3 is a block diagram showing an example of a functional configuration of an acquiring portion 203.

FIG. 6 is a schematic diagram in which patches are represented by vectors.

DESCRIPTION OF THE EMBODIMENTS

Hereinafter, an embodiment according to the present invention will be described with reference to the accompanying drawings. The embodiment described below shows an example in which the present invention is specifically implemented, and is merely a specific example of a configuration recited in the appended claims.

First Embodiment

Example of Hardware Configuration of Image Processing Apparatus

Figure 1:
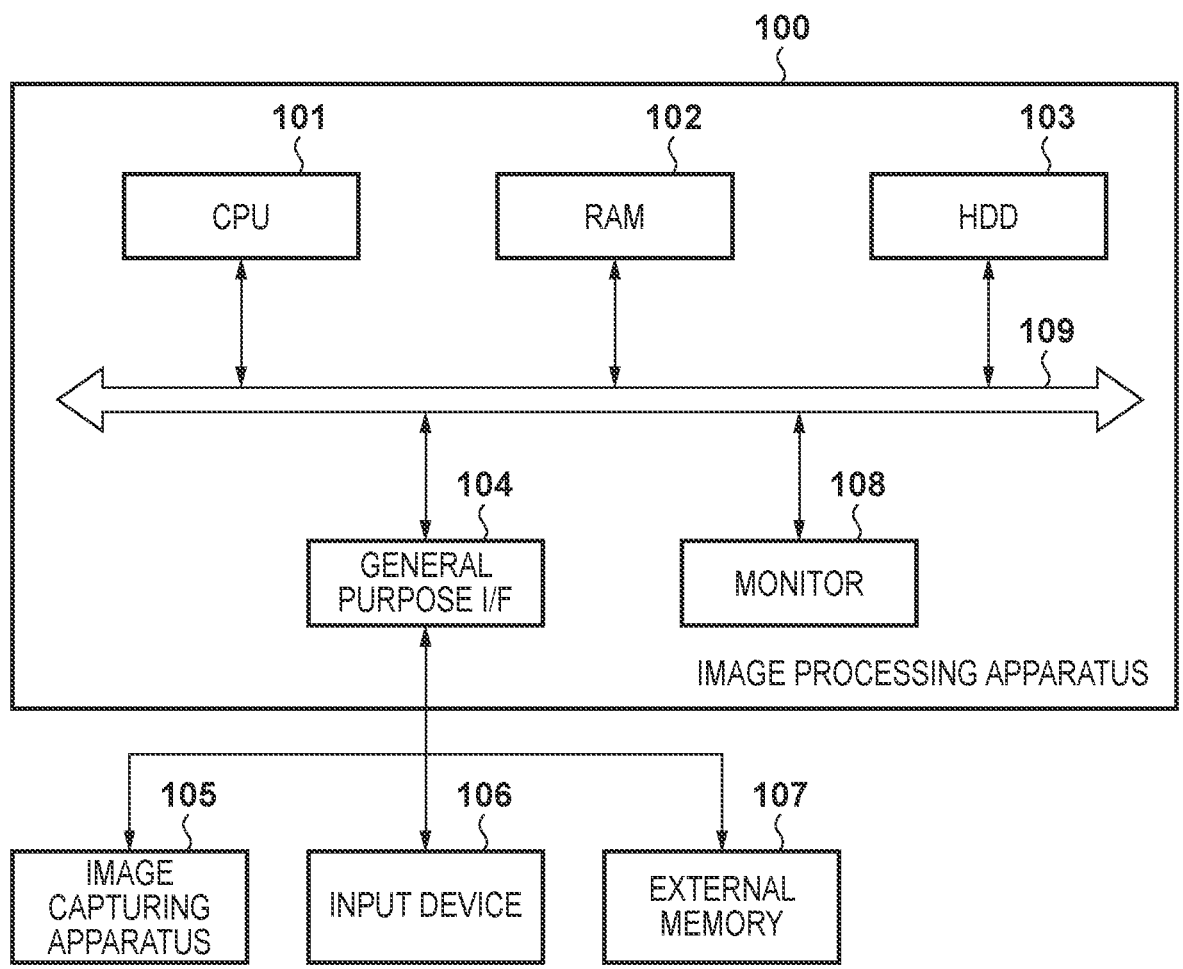
FIG. 1 is a block diagram showing an example of a hardware configuration of an image processing apparatus 100.

A hardware configuration of an image processing apparatus 100 according to the present embodiment will be described with reference to the block diagram shown in FIG. 1. The hardware configuration of the image processing apparatus 100 is merely an example, and thus changes and modifications can be made as appropriate.

A CPU 101 executes various types of processing using a computer program and data stored in a RAM 102. The CPU 101 thereby controls the overall operations of the image processing apparatus 100, and also executes or controls each process, which are described later as being performed by the image processing apparatus 100.

The RAM 102 includes an area for storing a computer program and data loaded from a HDD (hard disk drive) 103 and external data received via a universal I/F (interface) 104. The RAM 102 also includes a work area used by the CPU 101 to execute various types of processing. As described above, the RAM 102 can appropriately provide various types of areas.

In the HDD 103, an OS (operating system), computer programs and data are stored, the computer programs being computer programs for causing the CPU 101 to execute or control each process, which are described later as being performed by the image processing apparatus 100. The computer programs stored in the HDD 103 include a computer program for causing the CPU 101 to execute the functions of each of the functional portions of the image processing apparatus 100, which will be described in the following description. Also, the data stored in the HDD 103 includes information (pre-set information, information acquired in advance, and the like), which is treated as known information in the following description. The computer programs and data stored in the HDD 103 are loaded to the RAM 102 as appropriate under control of the CPU 101, and processed by the CPU 101.

The universal I/F 104 is connected to an image capturing device 105, an input device 106, and an external memory 107. The universal I/F 104 includes one or more connection interfaces, and is used to connect various types of devices including the image capturing device 105, the input device 106, and the external memory 107 to the image processing apparatus 100.

The image capturing device 105 is a digital image capturing device that generates digital image data by converting light received by a photocharge conversion element (imaging device) such as a CCD or CMOS sensor to a digital signal, and outputs the generated digital image data to the image processing apparatus 100. The CPU 101 acquires digital image data received from the image capturing device 105 via the universal I/F 104 as an input image, and stores the acquired input image in the RAM 102 or the HDD 103.

The input device 106 includes user interfaces such as a keyboard and a mouse, and various types of instructions can be input to the CPU 101 through operations made by the user.

The external memory 107 is a memory device, such as an SD card or a USB memory, that is attachable to and detachable from the image processing apparatus 100. The input image to be subjected to a noise reduction process performed by the image processing apparatus 100 may be acquired from the image capturing device 105, from the HDD 103, or from the external memory 107.

A monitor 108 includes a CRT, a liquid crystal screen or the like, and can display a result of processing performed by the CPU 101, in the form of images, characters, and the like. The input device 106 and the monitor 108 may be combined to form a touch panel screen. The CPU 101, the RAM 102, the HDD 103, the universal I/F 104, and the monitor 108 are connected to a bus 109.

Input Image

First, the input image to be subjected to the noise reduction process of the present embodiment will be described. In an imaging device (image sensor) included in a digital image capturing device, (luminance-dependent) noise occurs in an amount that depends on the amount of incident light. Noise is caused by fluctuations of physical photons. Accordingly, in an image captured by a sensor, different amounts of noise are added to the pixels unless an image of a subject with uniform brightness is captured. In the present embodiment, an image captured by the sensor of the digital image capturing device described above, or in other words, an image in which different amounts of noise have been added to individual pixels is acquired as an input image, and a noise reduction process is performed on the input image.

Summary of Processing of NL Bayes Method

Next, the noise reduction process using the NL Bayes method, which is the premise of the present embodiment, will be explained briefly. First, a plurality of pixels in an input image are set as pixels of interest, and a set of patches are generated for each pixel of interest. Next, the noise of each patch included in the generated set of patches is reduced. First, an average value of each pixel in the patches and a covariance matrix calculated by totaling the product of two arbitrarily selected pixel values in each patch with respect to all patches in the set of patches are obtained. With the average value and the covariance matrix, the prior probability followed by the pixel values of an ideal noise-free image is modeled (assumed). Next, using the Bayes' theorem represented by "posterior probability=likelihood× prior probability", the pixel values of the patches are determined so as to maximize the posterior probability. That is, the modeled prior probability and previously measured image noise variance (which depends on the imaging device (sensor) of the digital image capturing device) corresponding to the likelihood are applied to the Bayes' theorem, and the pixel values of each patch are determined so as to maximize the posterior probability. As a result, patches with reduced noise are obtained. Then, the patches with reduced noise are composited to generate an output image with reduced noise. The compositing of patches described above is called "aggregation". Specifically, each patch with reduced noise is returned to its original patch position in the input image, and with respect to a pixel in which a plurality of patches overlap, the pixel values are averaged, or weight averaged based on the degree of similarity. The foregoing description is the content of the noise reduction process using the NL Bayes method.

In the present embodiment, based on the noise reduction process using the NL Bayes method described above, the theory of a modified NL Bayes method is formulated so as to cope with an input image in which the amount of noise in each pixel is not the same (the noise in the input image is not uniform). A description of a basic embodiment in which the modified NL Bayes method is carried out will also be given.

Definition of Terms

Here, the definitions of the terms used in the following description are provided. A "patch" refers to a rectangular image region that is a portion of an input image and is formed of a plurality of pixels. Hereinafter, a patch that is formed of a plurality of pixels relative to a pixel of interest among the pixels in the input image will be referred to as a "patch of interest". Also, a patch that is referred to when noise reduction is performed on the patch of interest and is set in the vicinity of the patch of interest will be referred to as a "reference patch". The reference patch refers to a patch that is formed of a plurality of pixels relative to a reference pixel corresponding to the pixel of interest. Because a plurality of reference pixels are set for one pixel of interest, a plurality of reference patches are present per pixel of interest. The set of patches mentioned above refers to a set of a patch of interest and reference patches having a high degree of similarity to the patch of interest selected from among a plurality of reference patches.

Modified NL Bayes Method for Luminance-Dependent Noise

Theoretical expressions of an NL Bayes method for an input image with non-uniform noise (an input image in which the amount of noise in each pixel is not the same) and an algorithm calculated based on theoretical expressions will be described first. As shown in Expression (1) given below, it is assumed that, in the pixel value of each pixel of a captured image, noise corresponding to standard deviation σ has been added to the original pixel value that is free from noise.

$$\tilde{x} = x + n_x \quad (1)$$

At this time, a conditional probability density function for obtaining pixel value $$\tilde{x}$$

captured when pixel value x is present can be represented by Expression (2) given below.

$$P(\tilde{x} \mid x) = \frac{1}{(2\pi\sigma^2)^{1/2}} \exp\left(-\frac{\|x - \tilde{x}\|^2}{2\sigma_x^2}\right) \quad (2)$$

Next, consideration is given to an N-dimensional (k×k) patch. Random variables $x_i$ (i=1, ..., and N) are given, and it is assumed that all random variables independently follow a Gaussian distribution. Because N random variables are all independent, their joint distribution p (x1, ..., xN)=p(x) can be represented by Expressions (3) and (4) given below.

$$p(x_1, x_2, \ldots, x_N) = p(x) = p(x_1)p(x_2) \ldots p(x_N) = \Pi_{n=1}^{N} p(x_N) \quad (3)$$

Here, it is assumed that $$p(x) = \left(\frac{1}{(2\pi)^{N/2}} \prod_{i=1}^{N} \frac{1}{(\sigma_{x_i}^2)^{1/2}}\right) \exp\left(-\sum_{i=1}^{N} \frac{\|x_i - u_i\|^2}{2\sigma_{x_i}^2}\right) \quad (4)$$

$$= \frac{1}{(2\pi)^{N/2} |\Sigma|^{1/2}} \exp\left(-\frac{(x-u)^T \Sigma^{-1} (x-u)}{2}\right)$$

$$\Sigma^{-1} = \begin{bmatrix} 1/\sigma_1^2 & & 0 \\ & \ddots & \\ 0 & & 1/\sigma_n^2 \end{bmatrix} \quad x = \begin{bmatrix} x_1 \\ x_2 \\ \vdots \\ x_N \end{bmatrix} \quad u = \begin{bmatrix} u_1 \\ u_2 \\ \vdots \\ u_N \end{bmatrix}$$

Accordingly, a conditional probability density function for obtaining patch $$\tilde{P}$$

captured when there is noise-free patch P is present can be represented by Expression (5) given below.

$$P(\tilde{P} \mid P) = c \cdot \exp\left(-\frac{(\tilde{P} - P)^T \Sigma^{-1} (\tilde{P} - P)}{2}\right) \quad (5)$$

At this time, based on the Bayes' theorem, when a captured patch with noise is represented by $$\tilde{P},$$

the posterior probability $$P(P \mid \tilde{P})$$

of the noise-free patch P can be represented by Expression (6) given below.

$$P(P \mid \tilde{P}) = \frac{P(\tilde{P} \mid P) P(P)}{P(\tilde{P})} \quad (6)$$

With the NL Bayes, the posterior probability $$P(P|\tilde{P})$$

is maximized to estimate a noise-free patch. It is assumed that similar patches Q that are similar to patch P are plotted in a multidimensional normal distribution, and prior probability P(Q) is given as P(P) of Expression (6), as shown in Expression (7) given below.

$$P(Q) = \frac{1}{(2\pi)^{N/2}|C_P|^{1/2}} \exp\left(-\frac{(Q-\overline{P})^T C_P^{-1}(Q-\overline{P})}{2}\right) \quad (7)$$

$$= \alpha \cdot e^{-\frac{(Q-\overline{P})^T C_P^{-1}(Q-\overline{P})}{2}}$$

Here, α represents a normalized constant. From Expressions (5) to (7), maximizing $$P(P|\tilde{P})$$

and an issue of equivalence can be derived as in Expression (8) given below.

Here, it is assumed that $$\operatorname*{argmax}_{P} P(P|\tilde{P}) = \operatorname*{argmax}_{P} P(\tilde{P}|P)P(P) \quad (8)$$

$$= \operatorname*{argmax}_{P} \exp\left(-\frac{(P-\tilde{P})^T \sum^{-1}(P-\tilde{P})}{2}\right)$$

$$\exp\left(-\frac{(P-\overline{P})^T C_P^{-1}(P-\overline{P})}{2}\right)$$

$$= \operatorname*{argmax}_{P}(P-\tilde{P})^T \sum^{-1}(P-\tilde{P}) + (P-\overline{P})^T C_P^{-1}(P-\overline{P})$$

$$\sum = \begin{bmatrix} \sigma_1^2 & & 0 \\ & \ddots & \\ 0 & & \sigma_n^2 \end{bmatrix} \sum^{-1} = \begin{bmatrix} 1/\sigma_1^2 & & 0 \\ & \ddots & \\ 0 & & 1/\sigma_n^2 \end{bmatrix}$$

Also, it is assumed that $$C_{\tilde{P}}$$

and $$\overline{\tilde{P}}$$

are represented by Expressions (9) to (10) given below.

$$C_{\tilde{P}} = C_P + \Sigma \quad (9)$$

$$\overline{\tilde{P}} = \overline{P} \quad (10)$$

Expression (8) gives 0 when it is differentiated by P as shown in Expression (11) given below.

$$2\sum^{-1}(P-\tilde{P}) + 2(C_P-\Sigma)^{-1}(P-\overline{\tilde{P}}) = 0 \quad (11)$$

$$(P-\tilde{P}) + \sum(C_{\tilde{P}}-\Sigma)^{-1}(P-\overline{\tilde{P}}) = 0$$

$$\left[I + \sum(C_{\tilde{P}}-\Sigma)^{-1}\right]P - \tilde{P} - \sum(C_{\tilde{P}}-\Sigma)^{-1}\overline{\tilde{P}} = 0 \quad (12)$$

$$C_{\tilde{P}}(C_{\tilde{P}}-\Sigma)^{-1} = I + \sum(C_{\tilde{P}}-\Sigma)^{-1}$$

$$C_{\tilde{P}}(C_{\tilde{P}}-\Sigma)^{-1}P = \tilde{P} + \sum(C_{\tilde{P}}-\Sigma)^{-1}\overline{\tilde{P}}$$

$$P = (C_{\tilde{P}} - \Sigma)C_{\tilde{P}}^{-1}\tilde{P} + \left[(C_{\tilde{P}} - \Sigma)C_{\tilde{P}}^{-1}\right]\left[\sum(C_{\tilde{P}} - \Sigma)\sum^{-1}\right]^{-1}\overline{\tilde{P}}$$

$$= (C_{\tilde{P}} - \Sigma)C_{\tilde{P}}^{-1}\tilde{P} + (I - \sum C_{\tilde{P}}^{-1})[(C_{\tilde{P}} - \Sigma)\sum^{-1}]^{-1}\overline{\tilde{P}}$$

$$= (C_{\tilde{P}} - \Sigma)C_{\tilde{P}}^{-1}\tilde{P} + (I - \sum C_{\tilde{P}}^{-1})(C_{\tilde{P}} - \sum^{-1} - I)^{-1}\overline{\tilde{P}}$$

$$= (C_{\tilde{P}} - \Sigma)C_{\tilde{P}}^{-1}\tilde{P} + (-I + C_{\tilde{P}}\sum^{-1} - C_{\tilde{P}}\sum^{-1} -$$

$$\sum C_{\tilde{P}}^{-1} + 2I)(C_{\tilde{P}}\sum^{-1} - I)^{-1}\overline{\tilde{P}}$$

$$= (C_{\tilde{P}} - \Sigma)C_{\tilde{P}}^{-1}\tilde{P} + I - (C_{\tilde{P}}\sum^{-1} - 2I + \sum C_{\tilde{P}}^{-1})$$

$$(C_{\tilde{P}}\sum^{-1} - I)^{-1}\overline{\tilde{P}}$$

$$= (C_{\tilde{P}} - \Sigma)C_{\tilde{P}}^{-1}\tilde{P} + I - (C_{\tilde{P}} - \Sigma)(\sum^{-1} - C_{\tilde{P}}^{-1})$$

$$(C_{\tilde{P}}\sum^{-1} - I)^{-1}\overline{\tilde{P}}$$

Here, $$\left(C_{\tilde{P}}\sum^{-1} - I\right)^{-1} = C_{\tilde{P}}\sum^{-1} - C_{\tilde{P}}C_{\tilde{P}}^{-1} \quad (13)$$

$$= C_{\tilde{P}}(\sum^{-1} - C_{\tilde{P}}^{-1})$$

$$= (\sum^{-1} - C_{\tilde{P}}^{-1})^{-1}C_{\tilde{P}}^{-1}, \text{ therefore}$$

$$= (C_{\tilde{P}} - \Sigma)C_{\tilde{P}}^{-1}\tilde{P} + I - (C_{\tilde{P}} - \Sigma)$$

$$(\sum^{-1} - C_{\tilde{P}}^{-1})(\sum^{-1} - C_{\tilde{P}}^{-1})^{-1}C_{\tilde{P}}^{-1}\overline{\tilde{P}}$$

$$= \overline{\tilde{P}} + (C_{\tilde{P}} - \Sigma)C_{\tilde{P}}^{-1}(\tilde{P} - \overline{\tilde{P}})$$

Accordingly, from among the patches in a captured image with noise, a noise-free patch can be obtained by using Expression (14) given below. This will be referred to as the result of the 1st STEP.

$$P^{1st} = \overline{\tilde{P}} + (C_{\tilde{P}} - \Sigma)C_{\tilde{P}}^{-1}(\tilde{P} - \overline{\tilde{P}}) \quad (14)$$

Furthermore, based on the result of 1st STEP, the covariance matrix $$C_{\tilde{P}}$$

and an average vector of the set of similar patches $$\overline{\tilde{P}}^{1st}$$

are re-calculated with higher accuracy as shown in Expression (15).

$$C_{\tilde{P}} = C_P^{1st} + \Sigma$$

$$\overline{\tilde{P}}^{1st} = \overline{P} \quad (15)$$

Then, in the 2nd STEP, the result of highly accurate noise reduction can be obtained by using Expression (16) given below.

$$P^{2nd} = \overline{\tilde{P}}^{1st} + C_P^{1st}(C_P^{1st} + \Sigma)(\tilde{P} - \overline{\tilde{P}}^{1st}) \quad (16)$$

Example of Functional Configuration of Image Processing Apparatus

An example of a functional configuration of the image processing apparatus 100 according to the present embodiment will be described next with reference to the block diagram shown in FIG. 2. Modifications and changes can be made to the configuration shown in FIG. 2 as appropriate. For example, one functional portion may be divided into a plurality of functional portions based on the functions, or alternatively, two or more functional portions may be combined into one functional portion. Also, the configuration shown in FIG. 2 may be implemented by two or more apparatuses. In this case, the apparatuses are connected by a circuit, or a wired or wireless network so as to perform data communication with each other to perform operations in cooperation with each other, and implement each process, which are described later as being performed by the image processing apparatus.

In the following description, the functional portions shown in FIGS. 2, 3, 5, 9, 10, and 13 may be described as a main element that performs processing, but the functions of the functional portions are actually implemented by the CPU 101 executing computer programs that correspond to the functional portions. The functional portions shown in FIGS. 2, 3, 5, 9, 10, and 13 may be implemented by hardware.

An input image (image data) is input to a pixel setting portion 201. The input image may be a RAW image, a grayscale image, an RGB three-channel image, or an RGGB four-channel image. The following description will be given assuming that the input image is a one-channel image, but the present invention is not limited thereto. The pixel setting portion 201 sets the coordinate location (coordinate location of interest) of a pixel (pixel of interest) in the input image, and the coordinate location (reference coordinate location) of each of a plurality of reference pixels corresponding to the pixel of interest.

A patch setting portion 202 sets a patch that includes the pixel of interest that is located at the coordinate location of interest, as a patch of interest. Furthermore, the patch setting portion 202 sets, for each reference coordinate location, a patch that includes the reference pixel that is located at the reference coordinate location, as a reference patch.

An acquiring portion 203 selects, from among a plurality of reference patches, reference patches that have a high degree of similarity to the patch of interest as similar patches, and acquires a set of similar patches that is a set of patches including the selected similar patches and the patch of interest.

An estimation portion 204 estimates a noise amount parameter of the patch of interest (the set of similar patches). An estimation portion 205 estimates a covariance matrix corresponding to the noise amount parameter of each pixel in the patch of interest based on the set of similar patches and the noise amount parameter estimated by the estimation portion 204. Also, the estimation portion 204 models (assumes) a prior probability that is followed by ideal noise-free pixel values in the patch of interest (and similar patches that are similar to the patch of interest), using an average patch and the covariance matrix corresponding to the noise amount parameter. A processing portion 206 reduces the noise of each patch that constitutes the set of similar patches. An image composition portion 207 composites (aggregates) the patches with reduced noise.

Example of Functional Configuration of Acquiring Portion 203

An example of a functional configuration of the acquiring portion 203 will be described with reference to the block diagram shown in FIG. 3. A calculation portion 301 calculates, for each reference patch set by the patch setting portion 202, a degree of similarity between the reference patch and the patch of interest. Specifically, where the patch of interest is represented by I, and the reference patch is represented by T, the degree of similarity between the patch I of interest and the reference patch T can be calculated using, for example, Expression (17) and Expression (18) given below.

$$R_{SAD} = \sum_{j=0}^{M-1}\sum_{i=0}^{M-1} |I(i,j) - T(i,j)| \qquad (17)$$

$$R_{SSD} = \sum_{j=0}^{M-1}\sum_{i=0}^{M-1} \{I(i,j) - T(i,j)\}^2 \qquad (18)$$

In Expression (17), a sum of absolute difference (SAD) is obtained as the degree of similarity between the patch I of interest and the reference patch T. In Expression (18), a sum of squared difference (SSD) is obtained as the degree of similarity between the patch I of interest and the reference patch T. In Expressions (17) and (18), the size of a patch (the patch I of interest or the reference patch T) is set to M pixels×M pixels. Also, in Expressions (17) and (18), the pixel value of a pixel at a coordinate location (i, j) in the patch I of interest is represented by I(i, j), and the pixel value of a pixel at a coordinate location (i, j) in the reference patch T is represented by T(i, j).

The degree of similarity calculated in Expression (17) or (18) indicates that the smaller the value ($R_{SAD}$ or $R_{SSD}$), the higher the degree of similarity between the patch of interest and the reference patch. The method for obtaining the degree of similarity is not limited to Expressions (17) and (18), and it is possible to use any other technique.

A selecting portion 302 selects (specifies) reference patches (similar patches) that are similar to the patch of interest from among the reference patches set by the patch setting portion 202 based on the degree of similarity calculated by the calculation portion 301. Then, the selecting portion 302 generates a set of patches (a set of similar patches) that includes the patch of interest and the selected reference patches. The selecting portion 302 may select top N (the definition of N will be given later) reference patches in descending order of the degree of similarity to the patch of interest, or may select reference patches determined as having a degree of similarity greater than or equal to a specified value as a result of comparing the degree of similarity calculated in Expression (17) or (18) with a specified value. As described above, the method for selecting reference patches that are similar to the patch of interest is not limited to a specific method.

However, the number of patches that constitute a set of similar patches has a significant influence when modeling (assuming) the prior probability. For example, if a set of similar patches including a reference patch that has a low degree of similarity to the patch of interest is generated, there is a reduction in the accuracy of prior probability. On the other hand, if a set of similar patches is generated by selecting only reference patches that have a high degree of similarity to the patch of interest, in the case of an insufficient number of reference patches that have a high degree of similarity to the patch of interest, the noise reduction process fails due to an insufficient number of patches. Accordingly, in the present embodiment, a method is used in which top N reference patches are selected in descending order of the degree of similarity to the patch of interest. The value of N is determined in advance according to the input image or the amount of noise in the input image (for example, the capturing sensitivity of the input image) such that the noise reduction process is realized and a desirable result is obtained. Hereinafter, N may be described as being the total number of patches included in a set of similar patches.

Details of Noise Amount Parameter Estimation

Figure 4:
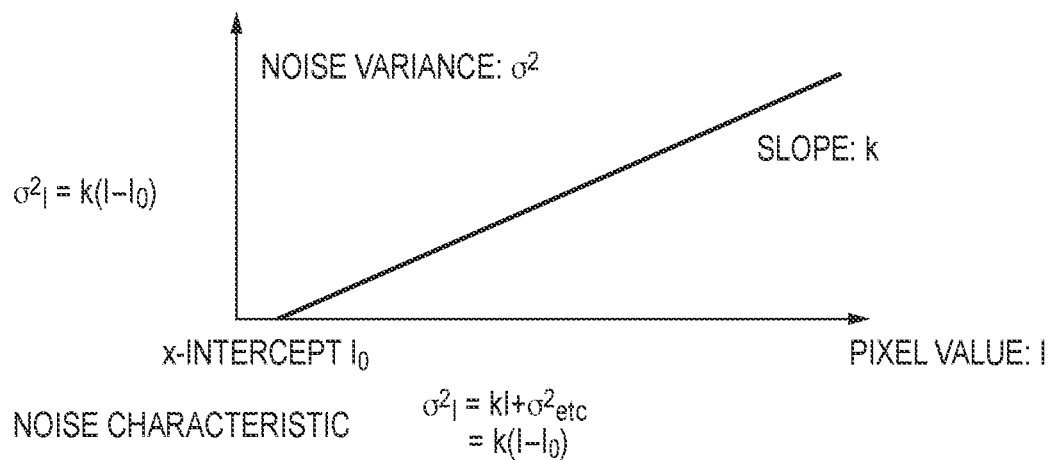
FIG. 4 is a schematic diagram in which the noise characteristics of a sensor are modeled with a first order approximation.

A noise amount parameter estimation process performed by the estimation portion 204 will be described. In an imaging device (image sensor) included in a digital image capturing device, noise occurs in an amount that depends on the amount of incident light. To be precise, the noise model of a sensor also depends on temperature and exposure time, and there is also a quadratic term of light quantity, and it is therefore difficult to perform strict modeling and parameter estimation. However, under most conditions, for example, with Expression (19) given below and a simple first order approximation as shown in FIG. 4, it is possible to estimate a noise amount parameter with practically sufficient accuracy to use in the noise reduction process.

$$\sigma_I^2 = k(I - I_0) \quad (19)$$

Here, $\sigma_1^2$ on the left-hand side represents the amount of noise corresponding to a pixel value of the input image, and k and $I_0$ represent the noise characteristics of the sensor that captured the input image. It is assumed that parameters of the noise characteristics are estimated in advance by performing an operation (processing) such as capturing and analyzing a chart for noise evaluation. With this configuration, the noise amount parameter of the patch of interest can be estimated based on the pixel value of each pixel in each patch included in the set of similar patches and Expression (19). The noise amount parameter of the patch of interest can be represented by Expression (20) given below, and $\sigma_1^2$, $\sigma_2^2$, ..., and $\sigma_n^2$ represent the noise variance of each pixel that constitutes each patch. Although $\Sigma$ is a diagonal matrix (components other than diagonal components are 0), $\Sigma$ indicates that the noise generated in the sensor is independent for each pixel.

$$\Sigma = \begin{bmatrix} \sigma_1^2 & & 0 \\ & \ddots & \\ 0 & & \sigma_n^2 \end{bmatrix} \quad (20)$$

Details of Prior Probability Estimation

Figure 5:
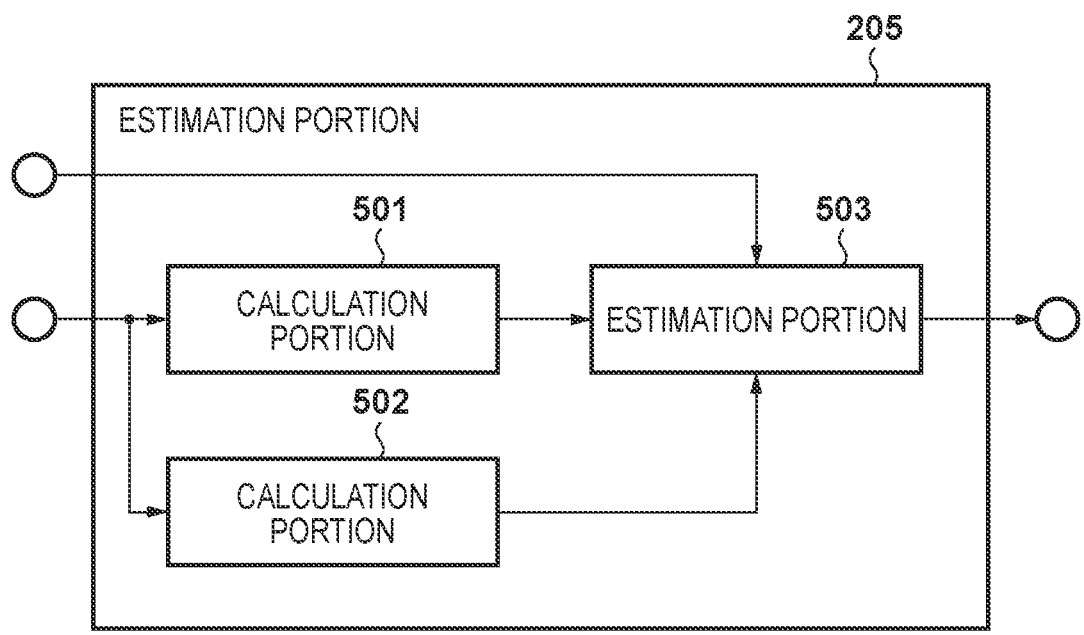
FIG. 5 is a block diagram showing an example of a functional configuration of an estimation portion 205.

An example of a functional configuration of the estimation portion 205 will be described with reference to the block diagram shown in FIG. 5. A calculation portion 501 collects pixel values at a coordinate location (x, y) from each of the patches included in the set of similar patches, and obtains an average value of the collected pixel values as an average value at the coordinate location (x, y). If it is assumed that each patch has a size of 3 pixels×3 pixels, and the coordinate location at the center of the patch is set to (0, 0), −1≤x, y≤1 is obtained. As described above, the estimation portion 205 obtains an average value of pixel values at each coordinate location in the patch. As a result, for example, with −1≤x, y≤1, a one-dimensional vector including 9 (=3×3) average values as elements is obtained. Here, for the subsequent matrix operation, as shown in FIG. 6, the patches will be shown and treated as one-dimensional vectors.

A calculation portion 502 calculates a variance covariance matrix based on the set of similar patches. The variance covariance matrix calculated here is a variance covariance matrix based on the assumption that the noise is not luminance-dependent (the amount of noise is uniform). The average vector and the variance covariance matrix can be calculated by Expression 21 given below.

$$\forall \tilde{Q} \in Sim(\tilde{P}) \quad (21)$$

$$\bar{\tilde{P}} \cong \frac{1}{N_1} \sum_{\tilde{Q} \in Sim(\tilde{P})} \tilde{Q}$$

-continued $$C_{\tilde{P}} \cong \frac{1}{N_1 - 1} \sum_{\tilde{Q} \in Sim(\tilde{P})} (\tilde{Q} - \bar{\tilde{P}})(\tilde{Q} - \bar{\tilde{P}})^t$$

In Expression 21, $\tilde{P}$ represents the patch of interest, $Sim(\tilde{P})$ represents a patch (a patch of interest, a similar patch) that constitutes the set of similar patches, $\tilde{Q}$ represents a column vector of each patch that constitutes the set of similar patches. Also, $N_1$ represents the number of patches that constitute the set of similar patches. Also, $\bar{\tilde{P}}$ represents an average column vector of the set of similar patches. Also, $C_{\tilde{P}}$ represents a variance covariance matrix of the set of similar patches.

An estimation portion 503 estimates a variance covariance matrix that gives consideration to the luminance-dependency of the amount of noise, and estimates prior probability model parameters followed by ideal noise-free pixel values of the patch of interest (and the similar patches that are similar to the patch of interest), using the noise amount parameters and the estimated variance covariance matrix. According to the NL Bayes method, a multidimensional normal distribution is used as the prior probability model based on the assumption that the set of similar patches (similar patch group) can be represented by the multidimensional normal distribution. Accordingly, the average vector that is a parameter that represents the multidimensional normal distribution and the variance covariance matrix are obtained. At this time, the parameters of the prior probability model need to be estimated from an input image with noise. That is, the parameters of the prior probability model that need to be estimated are $\bar{P}, C_P,$ and not $\bar{\tilde{P}}, C_{\tilde{P}}$ Accordingly, $\bar{P}, C_P$ is estimated using the assumptions of Expressions (9) and (10) based on the theory of the modified NL Bayes method from $\bar{\tilde{P}}, C_{\tilde{P}}$ that can be calculated from the input image. It is thereby possible to estimate a parameter that represents the multidimensional normal distribution of the patch of interest (and the similar patches that are similar to the patch of interest) followed by ideal noise-free pixel values.

Details of Image Patch Noise Reduction Process

Hereinafter, the processing performed by the processing portion 206 will be described. In the NL Bayes method, the result of noise reduction in each patch is obtained by determining the pixel values of the patch such that the posterior probability is maximized, using the Bayes' theorem represented by "posterior probability=likelihood×prior probability". Specifically, the matrix operation represented by Expression (22) may be performed based on the parameters obtained by Expression (21). Here, $Q^{1st}$ represents a patch with reduced noise, and is determined relative to each patch $$\tilde{Q}$$

that constitutes the set of similar patches.

$$Q^{1st} = \bar{\tilde{P}} + [C_{\tilde{P}} - S_{\sigma^2}]C_{\tilde{P}}^{-1}(\tilde{Q} - \bar{\tilde{P}})$$ (22)
$$= \tilde{Q} - S_{\sigma^2}C_{\tilde{P}}^{-1}(\tilde{Q} - \bar{\tilde{P}})$$

$$S_{\sigma^2} = \text{diag}(\sigma_1^2, \sigma_2^2, \ldots, \sigma_{N_t}^2) = \begin{bmatrix} \sigma_1^2 & & & \\ & \sigma_2^2 & & \\ & & \ddots & \\ & & & \sigma_{N_t}^2 \end{bmatrix}$$

The patch $Q^{1st}$ with reduced noise calculated by using Expression (22) is the result of the 1st STEP, and it is also possible to obtain a result of the 2nd STEP with further improved noise reduction accuracy by re-estimating the prior probability model using the result of the 1st STEP. This will be described in a second embodiment.

Details of Image Composition Process

Figure 7:
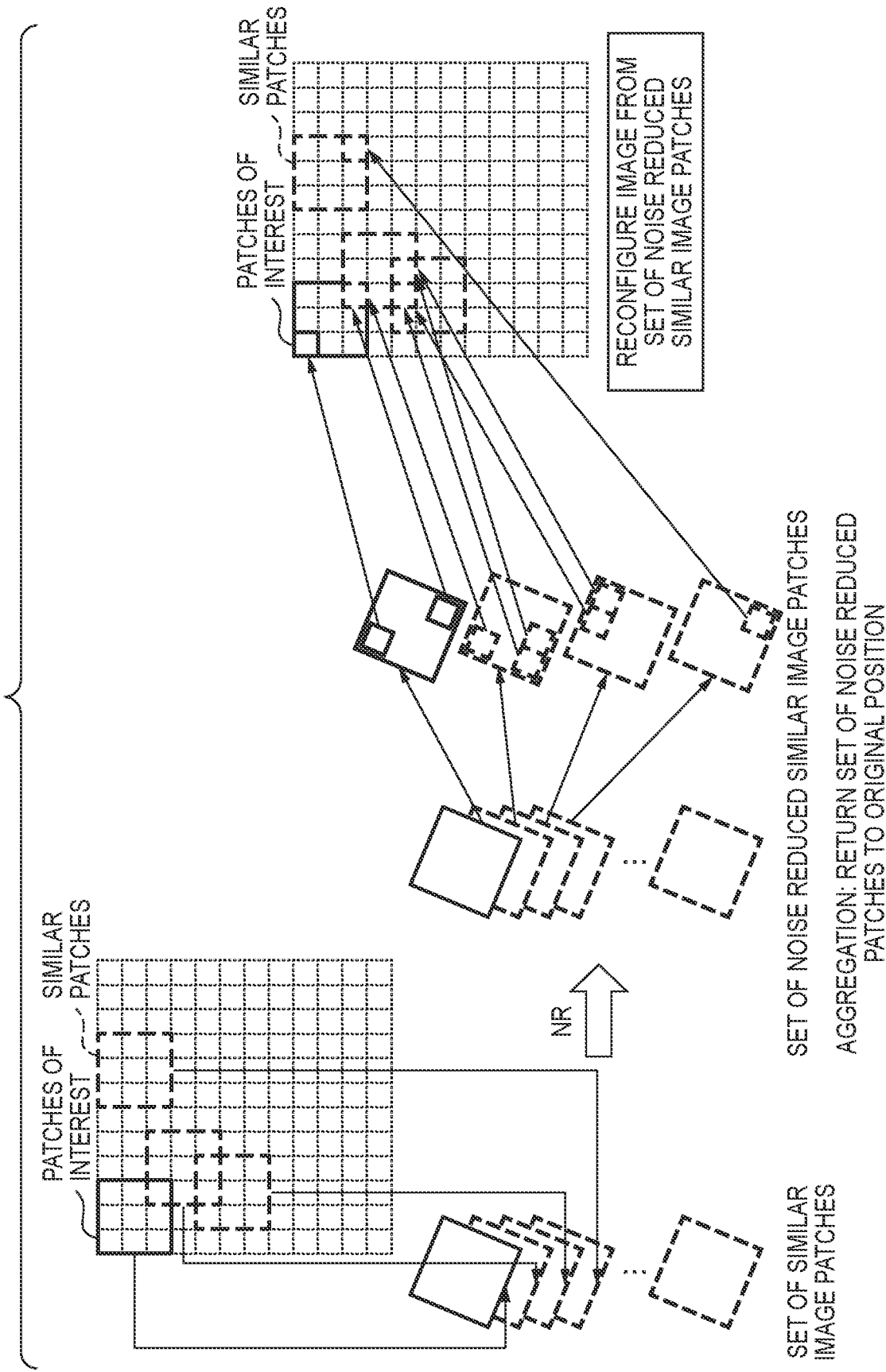
FIG. 7 is a schematic diagram illustrating an aggregation process.

As described above, the image composition portion 207 composites (aggregates) the patches that constitute the set of similar patches with reduced noise. Specifically, the image composition portion 207 returns each patch with reduced noise to its original patch position, and with respect to the pixel value of a pixel in which a plurality of patches overlap, the average value of the pixel values of the pixels in the plurality of patches that overlap the pixel in which the plurality of patches overlap is applied. This is shown in FIG. 7. As the pixel value of the pixel in which the plurality of patches overlap, a weighted average value of the pixel values of the pixels in the plurality of patches that overlap the pixel in which the plurality of patches overlap is applied may be applied, and the degree of similarity may be used as the weight, for example. An image with reduced noise can be obtained in the manner described above.

Noise Reduction Process Flow

Figure 8:
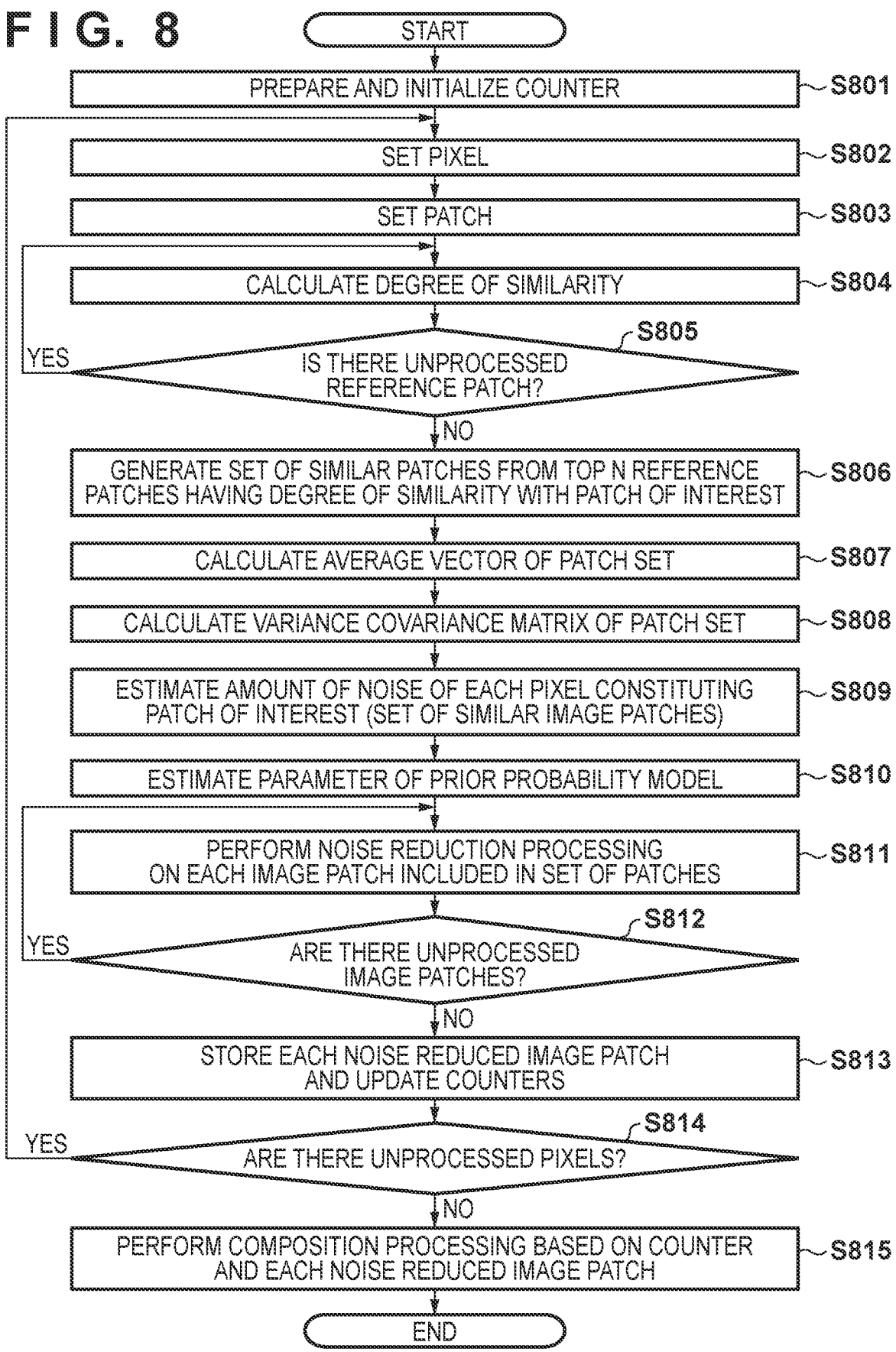
FIG. 8 is a flowchart of a noise reduction process performed by the image processing apparatus 100.

A noise reduction process performed on the input image by the image processing apparatus 100 according to the present embodiment will be described next with reference to the flowchart shown in FIG. 8.

In step S801, the CPU 101 initializes counters corresponding to each pixel in the input image to 0. The counters are used to store (count) the number of times a patch overlaps the pixel (the number of patches that overlap the pixel) because a plurality of patches overlap during aggregation.

In step S802, the CPU 101 acquires an input image from the image capturing device 105, the HDD 103, the external memory 107, or the like, and stores the input image in the RAM 102. Then, the CPU 101 sets the coordinate location (coordinate location of interest) of an arbitrarily selected pixel (pixel of interest) in the input image and the coordinate location (reference coordinate location) of each of a plurality of reference pixels corresponding to the pixel of interest. Normally, the pixels in the vicinity of the pixel of interest are used as the reference pixels. Specifically, the pixels in a search range (rectangular region) of a defined size around the pixel of interest are defined as the reference pixels. In general, the larger the search range, the more the performance is improved although this leads to an increase in the amount of calculation. The reason being that a greater number of similar patches with a high degree of similarity to the patch of interest can be collected by increasing the number of reference pixels.

In step S803, the CPU 101 sets a patch including the pixel of interest that is the pixel at the coordinate location of interest as the patch of interest. Furthermore, the CPU 101 sets, for each reference coordinate location, a patch including the reference pixel that is the pixel at the reference coordinate location as a reference patch. The optimal size (patch size) of the patch of interest or each reference patch varies according to the amount of noise in the input image or the subject area, and for example, sizes such as 3 pixels×3 pixels, 5 pixels×5 pixels, and 7 pixels×7 pixels are used. Here, the patch size is set based on the noise characteristics of the sensor that captured the input image.

In step S804, the CPU 101 selects one reference patch that has not been selected (that has not been processed) from among the plurality of reference patches set in step S803 (the reference patches set for each reference pixel), as a selected reference patch. Then, the CPU 101 calculates a degree of similarity between the patch of interest and the selected reference patch.

In step S805, the CPU 101 determines whether or not there is still a reference patch that has not been selected as the selected reference patch in the plurality of reference patches set in step S803. As a result of determination, if it is determined that there still is a reference patch that has not been selected as the selected reference patch in the plurality of reference patches set in step S803, the processing returns to step S804. On the other hand, if it is determined that there is no reference patch that has not been selected as the selected reference patch in the plurality of reference patches set in step S803, the processing advances to step S806.

In step S806, the CPU 101 selects, from among the plurality of reference patches, top N reference patches in descending order of the degree of similarity to the patch of interest as similar patches, and generates a set of similar patches that includes the selected similar patches and the patch of interest.

In step S807, the CPU 101 calculates an average vector of the set of similar patches generated in step S806. In step S808, the CPU 101 calculates a variance covariance matrix of the set of similar patches generated in step S806. As described above, the calculation of the average vector and the variance covariance matrix are performed based on Expression (21).

In step S809, the CPU 101 estimates the amount of noise in each pixel that constitutes the patch of interest (the set of similar patches). Specifically, as described above, noise variance is calculated by substituting the pixel value of each pixel in the patch of interest into Expression (19), and then expressed in the form of Expression (20) as a noise amount parameter.

In step S810, the CPU 101 estimates a prior probability model based on the average vector obtained in step S807, the variance covariance matrix obtained in step S808, and the noise amount parameter obtained in step S809. Here, it is assumed that the set of similar patches (similar patch group) can be modeled with a multidimensional normal distribution when there is no noise. Accordingly, the average vector and the variance covariance matrix when there is no noise are estimated from the average vector and the variance covariance matrix calculated based on the input image with noise by using the assumption of Expressions (9) and (10).

In step S811, the CPU 101 selects one patch that has not been selected from among the patches included in the set of similar patches as a selected patch. Then, the CPU 101 performs, on the selected patch, a noise reduction process for reducing noise based on the matrix operation represented by Expression (22).

In step S812, the CPU 101 determines whether or not all patches included in the set of similar patches have been selected as the selected patch. As a result of determination, if it is determined that all patches included in the set of similar patches have been selected as the selected patch, the processing advances to step S813. On the other hand, if it is determined that there still is a patch that has not been selected as the selected patch in the patches included in the set of similar patches, the processing returns to step S811.

In step S813, the CPU 101 stores all patches on which noise reduction was performed in step S811 in the RAM 102 or the HDD 103, and updates the counters corresponding to the pixel positions of the patches in the input image. That is, for each pixel in the input image, the number of patches that overlap the pixel is counted, and added to the counter value of the pixel.

In step S814, the CPU 101 determines whether or not all pixels in the input image have been set as the pixel of interest in step S802. As a result of determination, if it is determined that all pixels in the input image have been set as the pixel of interest in step S802, the processing advances to step S815, and if it is determined that there still is a pixel that has not been set as the pixel of interest in the input image, the processing returns to step S802.

At this time, not all pixels in the input image need to be set as the pixel of interest, and for example, a setting may be made such that a patch that has been used as the set of similar patches even only once is not set as the patch of interest. With this configuration, it is possible to significantly speed up the processing while having little influence on the noise reduction effect in ordinary cases.

Figure 12:
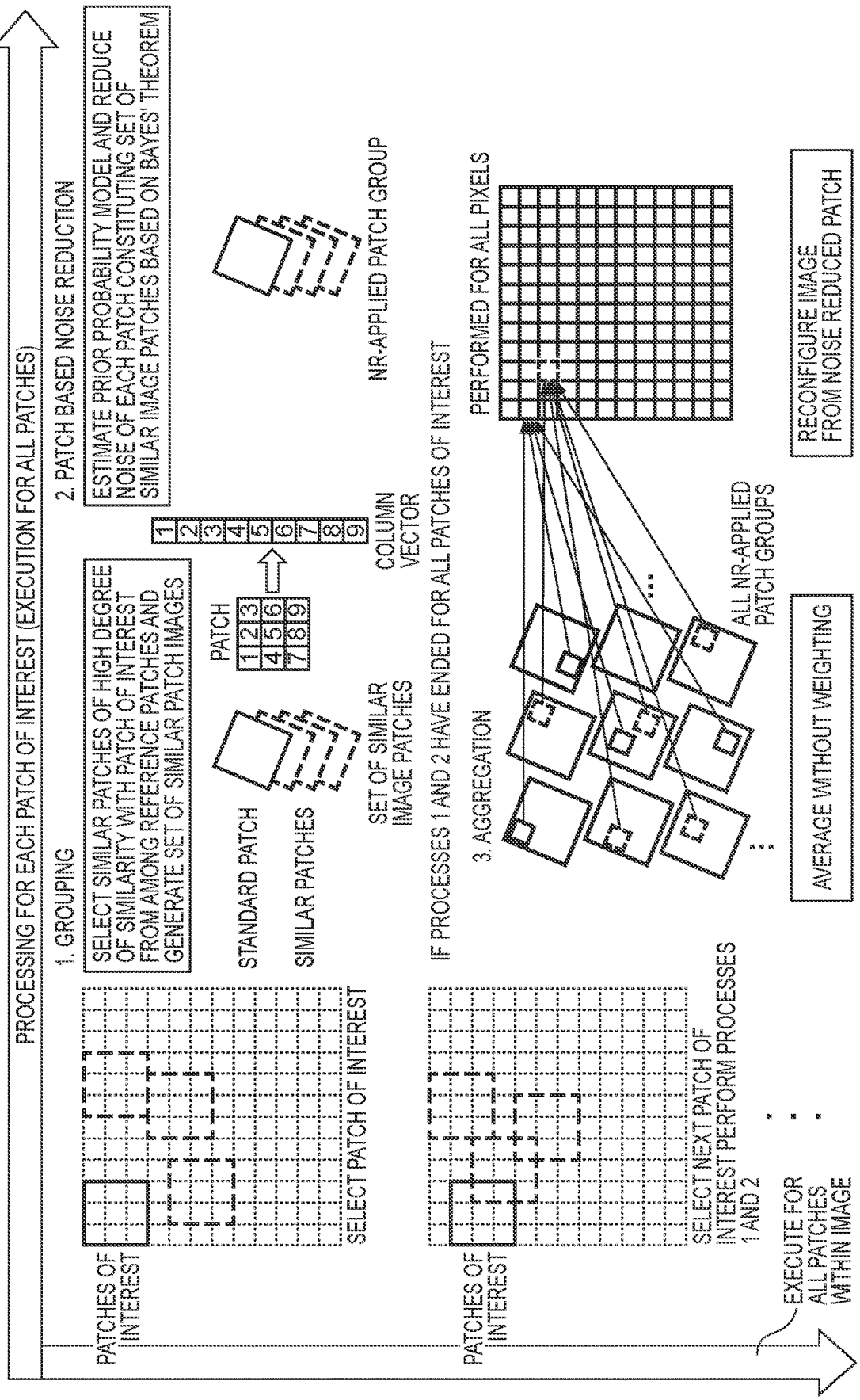
FIG. 12 is a schematic diagram illustrating a flow of the noise reduction process.

In step S815, the CPU 101 performs aggregation based on all sets of similar patches with reduced noise stored in the RAM 102 or the HDD 103 in step S813 and the counters. Then, the CPU 101 outputs an image with reduced noise obtained through the processing described above. The output destination to which the image with reduced noise is output is not limited to a specific output destination, and may be a device connected to the HDD 103, the external memory 107, or the universal I/F 104 (for example, an external device connected to the image processing apparatus 100 via a network). A flow of the noise reduction process described above is generally as shown in FIG. 12.

As described above, according to the present embodiment, it is possible to highly accurately reduce noise even in an image in which the amount of noise in each pixel is not uniform, such as an image captured by a digital image capturing device.

Second Embodiment

In the first embodiment, a basic embodiment has been described in which the modified NL Bayes method that deals with the case where the amount of noise in each pixel is not uniform in the input image is formulated, and the 1st STEP of the algorithm of the modified NL Bayes method is performed. Next, as a second embodiment, an embodiment will be described in which the method for estimating the amount of noise in a patch is devised by adding the 2nd STEP to the configuration of the first embodiment. Hereinafter, differences from the first embodiment will be described, and unless otherwise stated, the configuration is the same as that of the first embodiment.

Practical Problem of First Embodiment

With the modified NL Bayes method described in the first embodiment, it is possible to highly accurately reduce noise from the input image in which the amount of noise in each pixel is not uniform. However, depending on the subject in the input image, with the method described in the first embodiment, its original noise reduction performance may not be exhibited. The reason being that the set of patches generated to model (assume) the prior probability is not necessarily formed of only reference patches with a sufficiently high degree of similarity to the patch of interest. That is, the theory of the modified NL Bayes method assumes that the patch of interest and the similar patches have the same amount of noise, and if this assumption fails, it is not possible to estimate the prior probability followed by the pixel values of an ideal noise-free image, based on Expression (9). Depending on the patch size, a large number of similar patches are required to constitute a set of patches, and thus it is often the case that a dissimilar reference patch is included in the set of patches in an input image obtained by capturing an image of an ordinary subject. Accordingly, hereinafter, a method will be described with which it is possible to highly accurately reduce noise from a set of patches including a dissimilar patch by devising a method for estimating the amount of noise in a patch.

Example of Functional Configuration of Image Processing Apparatus

Figure 9:
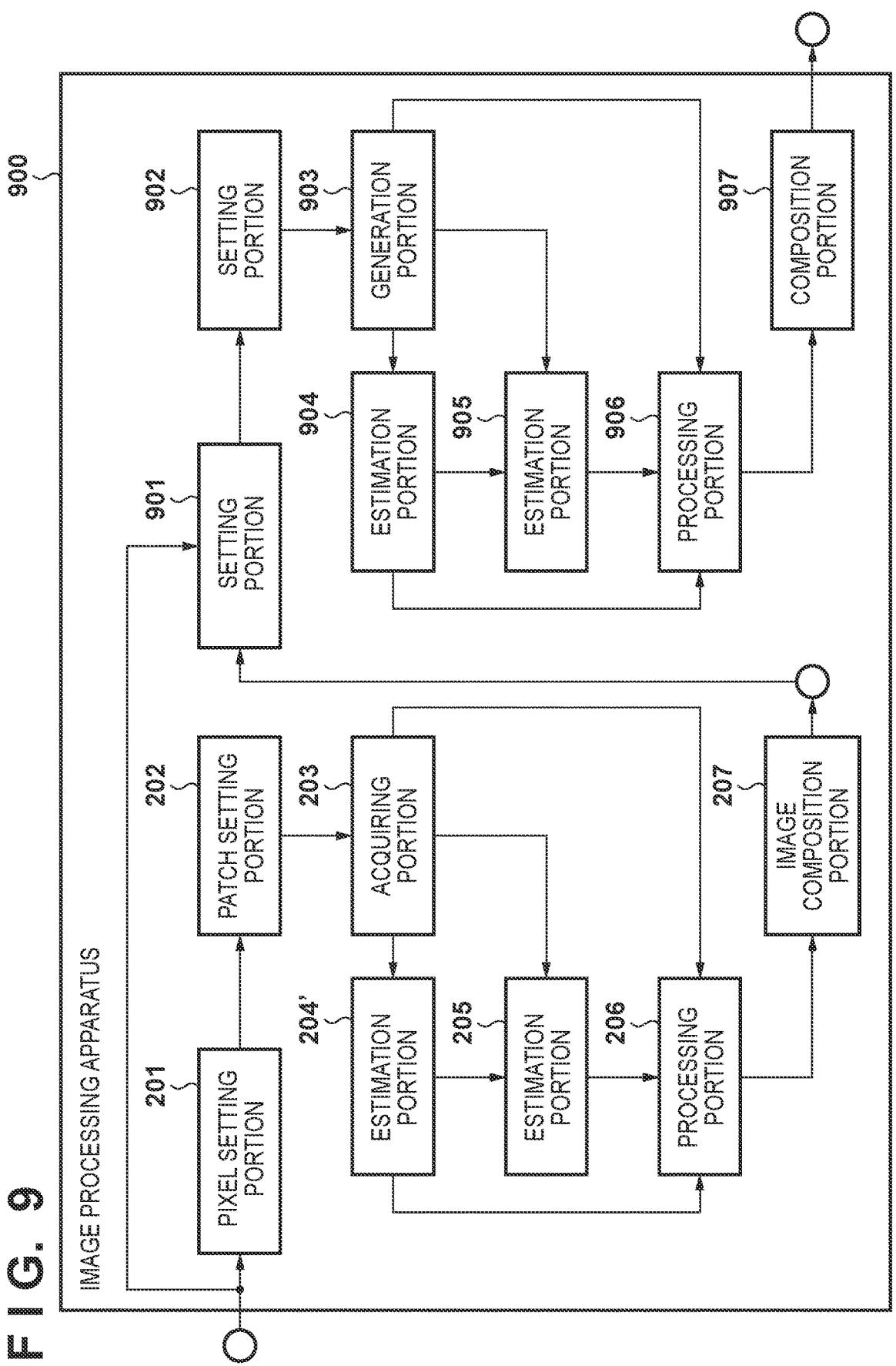
FIG. 9 is a block diagram showing an example of a functional configuration of an image processing apparatus 900.

An example of a functional configuration of an image processing apparatus 900 according to the present embodiment will be described with reference to the block diagram shown in FIG. 9. In the configuration shown in FIG. 9, functional portions that are the same as those shown in FIG. 2 are given the same reference numerals, and a description of the functional portions will be omitted.

An estimation portion 204' estimates a noise amount parameter of a patch of interest (a set of similar patches). A setting portion 901 sets, in each of two input images, a pixel of interest and reference pixels in the same manner as in the first embodiment. The two images input to the setting portion 901 are an input image and a post noise reduction-image (an image with reduced noise) obtained by the image composition portion 207, and the coordinates of the pixel of interest and the reference pixels that have been set are common between the input image and the image with reduced noise. A setting portion 902 sets a patch of interest and reference patches in each of the two input images in the same manner as in the first embodiment based on the coordinate location of the pixel of interest and the coordinate locations of the reference pixels that are set in each of the input image and the image with reduced noise by the setting portion 901. A generation portion 903 selects reference patches with a high degree of similarity to the patch of interest from among the plurality of reference patches in the image with reduced noise, and generates a set of similar patches in each of the input image and the image with reduced noise. An estimation portion 904 estimates a second noise amount parameter of the patch of interest (the set of similar patches). An estimation portion 905 models (assumes) a second prior probability followed by ideal noise-free pixel values in the patch of interest (and the similar patches that are similar to the patch of interest) based on the set of similar patches and the second noise amount parameter generated in each of the input image and the image with reduced noise. A processing portion 906 reduces noise in each patch that constitutes the set of similar patches in the input image. A composition portion 907 composites (aggregates) the patches that constitute the set of similar patches in the input image on which noise reduction has been performed.

Details of Noise Amount Parameter Estimation

Problem of Noise Amount Parameter Estimation

The noise amount parameter estimated by the noise amount parameter estimation portion is used in the estimation of a prior probability model parameter followed by ideal noise-free pixel values in the patch of interest (and the similar patches that are similar to the patch of interest) and in the noise reduction process. At this time, attention needs to be paid to the fact that the modified NL Bayes method is derived based on the assumption that the patch of interest and the similar patches that constitute the set of similar patches have the same amount of noise. That is, $\Sigma^{-1}$ in exp on the left-hand side that corresponds to $$P(\tilde{P}|P)$$

of Expression (8) of the theory of the modified NL Bayes method represents an inverse matrix (=inverse number) of the noise variance of the patch of interest. On the other hand, in order to calculate $C_P^{-1}$ in exp on the right-hand side of Expression (8), the same $\Sigma$ is also used in Expression (9), which means that the noise variance of each patch constituting the set of similar patches is equal to the noise variance of the patch of interest. That is, it is only when the set of similar patches is formed only of similar patches with a very high degree of similarity to the patch of interest that the assumption of Expression (9) is met and the modified NL Bayes method can be theoretically correctly applied.

Also, at the same time, there is a limitation on the number of similar patches that constitute the set of similar patches, and it is a value of (patch size×patch size+1) or more, which is a very large value. In addition, actually, although it depends on the amount of noise in the input image, in order to estimate a stable prior probability model parameter, a greater number of similar patches than the minimum number of similar patches are required. For this reason, in an input image obtained by capturing an image of an ordinary subject, it is often the case that a set of similar patches is generated by including a dissimilar reference patch that is not similar to the patch of interest. Even in this case, in order to exhibit a highly accurate noise reduction effect, the estimation portion 204' estimates the noise amount parameter of the patch of interest (the set of similar patches) in the manner described below instead of simply estimating from the pixel values of the patch of interest and Expression (19).

Details of Estimation Portion 204'

Figure 10:
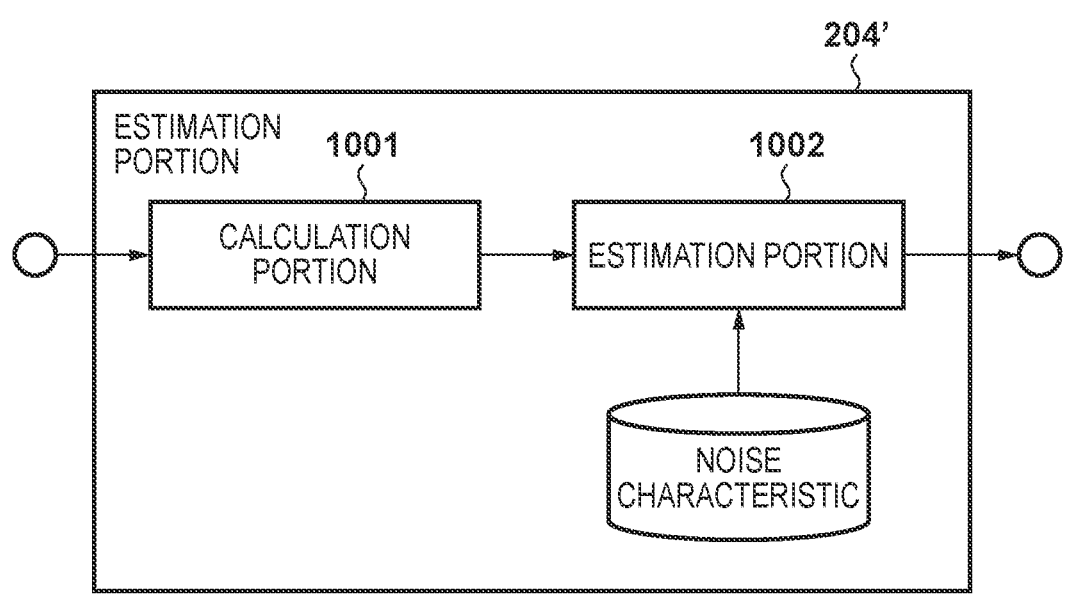
FIG. 10 is a block diagram showing an example of a functional configuration of an estimation portion 204'.

An example of a functional configuration of the estimation portion 204' will be described with reference to the block diagram shown in FIG. 10. A calculation portion 1001 calculates pixel values (estimation pixel values) for noise amount parameter estimation in order to estimate a common noise amount parameter that is common between the patches that constitute the set of similar patches. An estimation portion 1002 estimates a noise amount parameter using Expression (19) based on the pixel values of the patches estimated by the calculation portion 1001. Hereinafter, the details of the method for calculating an estimation pixel value and a flow of noise amount parameter estimation will be given.

The estimation pixel value is calculated using, for example, an average value per pixel (per pixel position) of all patches that constitute the set of similar patches. At this time, the average value may be calculated using a limited number of patches in descending order of the degree of similarity to the patch of interest, or a weighted average value may be used. However, the calculation needs to be performed using the patch of interest and one or more reference patches. In these methods, the number of pixels used for averaging is common between the pixels that constitute a patch. However, the number of pixels used for averaging is not necessarily common between the pixels, and for example, an estimation pixel value may be calculated in the manner described below.

(1) A noise amount parameter is estimated using Expression (19) based on the average value per pixel of all patches that constitute the set of similar patches. This is used as a temporary noise amount parameter. Because the noise variance is estimated in Expression (19), a noise standard deviation is calculated by obtaining the square root of the temporary noise amount parameter.

(2) For each pixel that constitutes the patch, as shown in Expression (23), the number of pixels used in averaging is determined based on the S/N ratio. That is, more pixels are used in averaging in darker portions where the S/N ratio is lower.

$$\frac{\sigma_{I_i}}{I_i} \propto C \qquad (23)$$

$I_i$: the pixel value of pixel i that constitutes the patch of interest $\sigma_{I_i}$: the noise standard deviation of pixel i C: the number of pixels used in averaging (3) For each pixel that constitutes a patch, an average value of target pixels in the patch of interest and top C reference patches in descending order of the degree of similarity to the patch of interest is calculated based on the number C of pixels determined by Expression (23), and the calculated average value is used as an estimation pixel value.

(4) A noise amount parameter is estimated using Expression (19) based on the estimation pixel value.

Figure 11:
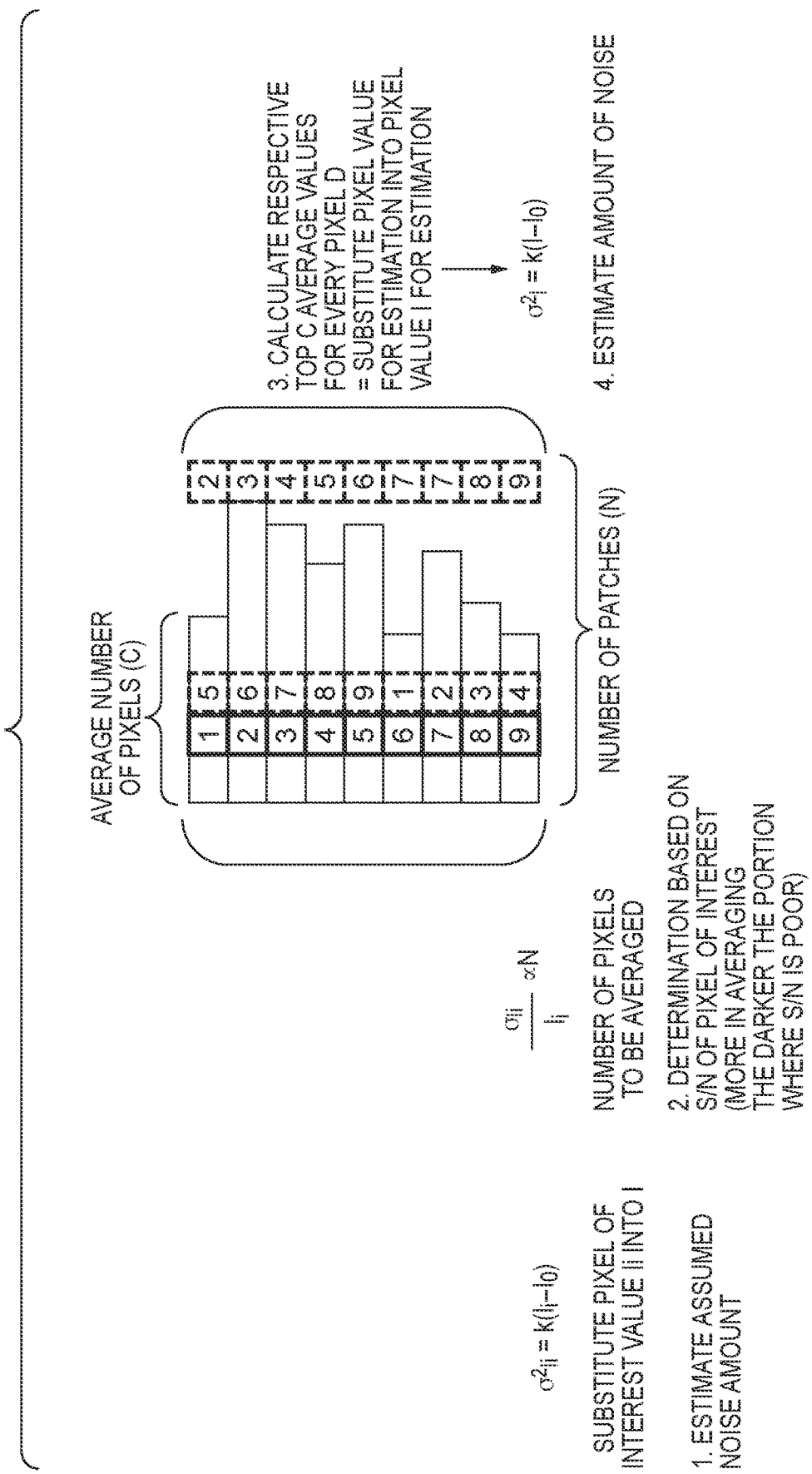
FIG. 11 is a schematic diagram illustrating a flow of noise amount parameter estimation.

FIG. 11 shows a flow of the noise amount parameter estimation. The pixel values used to estimate the temporary noise amount parameter in (1) may be the pixel values of the patch of interest. Also, instead of using the pixel values of the patch of interest in (2), the average value per pixel of all patches that constitute the set of similar patches may be used.

Details of Generation Portion 903

The generation portion 903 first generates a set of similar patches in the image with reduced noise in the same manner as in the first embodiment. Next, the generation portion 903 generates a set of similar patches in the input image, and at this time, the set of similar patches in the input image is generated using reference patches that are the same as those in the set of similar patches generated in the image with reduced noise, and this is different from the first embodiment. With this configuration, it is possible to more highly accurately select reference patches based on the degree of similarity calculated with the image with reduced noise rather than the input image with noise.

Details of Second Prior Probability Estimation

Figure 13:
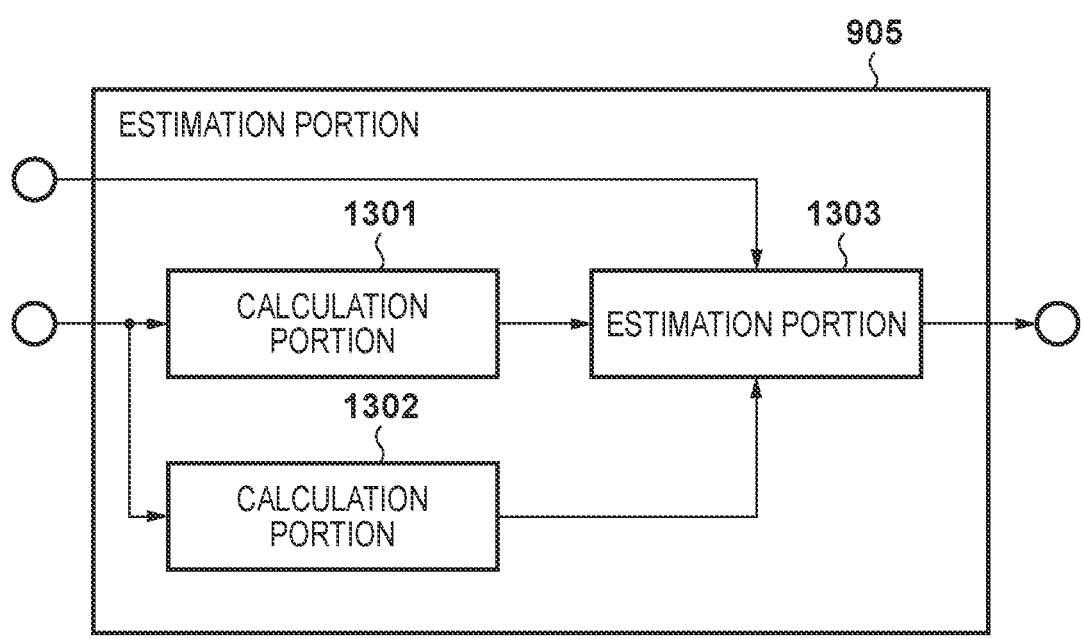
FIG. 13 is a block diagram showing an example of a functional configuration of an estimation portion 905.

An example of a functional configuration of the estimation portion 905 will be described with reference to the block diagram shown in FIG. 13. A calculation portion 1302 calculates a variance covariance matrix based on the set of similar patches generated in each of the input image and the image with reduced noise, and the calculated variance covariance matrix will be referred to as a "second variance covariance matrix". The second average vector and the second variance covariance matrix can be calculated based on Expression (24) given below.

$$\forall \tilde{Q} \in Sim(P^{1st}) \qquad (24)$$

$$\bar{P}^{1st} \cong \frac{1}{N_2} \sum_{Q^{1st} \in Sim(P^{1st})} \tilde{Q}$$

$$C_P^{1st} \cong \frac{1}{N_1 - 1} \sum_{Q^{1st} \in Sim(P^{1st})} \left(Q^{1st} - \bar{P}^{1st}\right)\left(Q^{1st} - \bar{P}^{1st}\right)^t$$

$P^{1st}$ represents the patch of interest in the image that has undergone the processing of the 1st STEP (the image with reduced noise), and $Sim(P^{1st})$ represents a patch (the patch of interest and a patch similar to the patch of interest) that constitutes the set of similar patches in the image that has undergone the processing of 1st STEP. Also, $$\tilde{Q}$$

represents a column vector of each patch that constitutes the set of similar patches in the input image, and $N_2$ represents the number of patches that constitute the set of similar patches. Also, $$\bar{P}^{1st}$$

represents an average column vector of the set of similar patches in the input image, and $$C_P^{1st}$$

represents a variance covariance matrix of the set of similar patches.

An estimation portion 1303 estimates a prior probability model parameter followed by ideal noise-free pixel values of the patch of interest (and the similar patches that are similar to the patch of interest). By generating a set of similar patches using the image with reduced noise after the processing of the 1st STEP, and calculating a variance covariance matrix, the estimation portion 1303 more highly accurately estimates the prior probability parameter than the estimation portion 503 does. Also, because the prior probability parameter that needs to be estimated by assuming Expression (25) is $$\bar{P}, C_P$$

the prior probability parameter is estimated using $$\bar{P}^{1st}, C_P$$

calculated by using Expression (24) and the assumption of Expression (25).

$$C_P = C_P^{1st} + \Sigma$$

$$\bar{P}^{1st} = \bar{P} \qquad (25)$$

Through the processing described above, it is possible to more highly accurately estimate a parameter that represents a multidimensional normal distribution of the patch of interest (and the similar patches that are similar to the patch of interest) followed by ideal noise-free pixel values.

Details of Second Image Patch Noise Reduction Process

The processing portion 906 reduces noise in each patch that constitutes the set of similar patches in the input image. Specifically, a matrix operation represented by Expression (26) may be performed based on the parameter obtained by Expression (24). Here, $Q^{2nd}$ represents the final patch with reduced noise, and is determined with respect to each patch $$\tilde{Q}$$

that constitutes the set of similar patches in the input image.

$$Q^{2nd} = \bar{P}^{1st} + C_P^{1st}[C_P^{1st} + S_{\sigma^2}]^{-1}\left(\tilde{Q} - \bar{P}^{1st}\right) \qquad (26)$$

$$= \tilde{Q} - S_{\sigma^2}(C_P^{1st} + S_{\sigma^2})^{-1}\left(\tilde{Q} - \bar{P}^{1st}\right)$$

$$S_{\sigma^2} = \text{diag}(\sigma_1^2, \sigma_2^2, \ldots, \sigma_{N_2}^2)$$

Through the processing described above, by devising a method for estimating the amount of noise in a patch, it is possible to highly accurately perform noise reduction on a set of patches including a dissimilar patch. Also, by re-estimating the prior probability parameter using the result of 1st STEP, and calculating the result of 2nd STEP, it is possible to obtain a result with even more accurate noise reduction.

Flow of Noise Reduction Process

Figure 14:
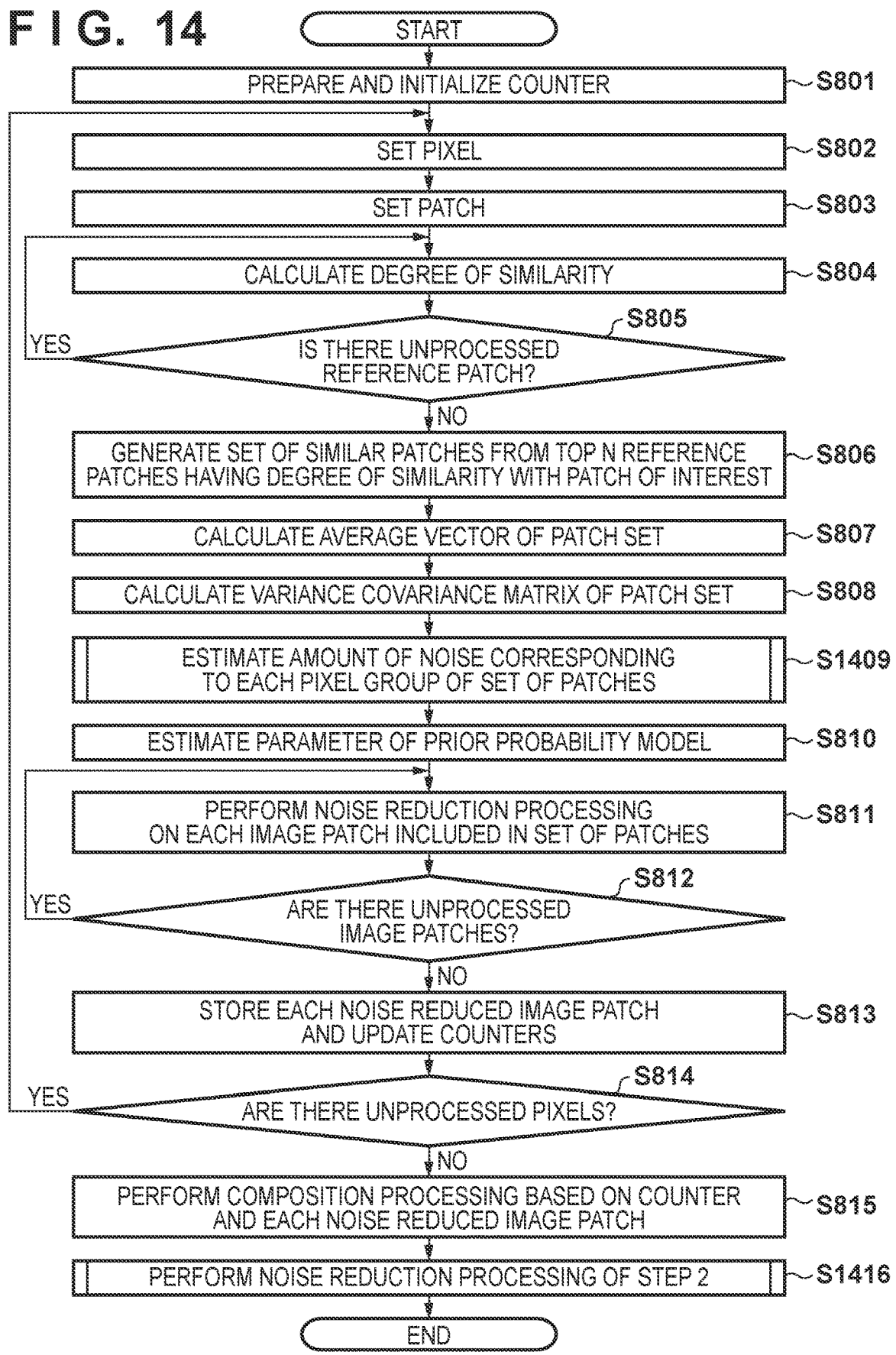
FIG. 14 is a flowchart of a noise reduction process performed by the image processing apparatus 900.

A noise reduction process performed on the input image by the image processing apparatus 900 according to the present embodiment will be described next with reference to the flowchart shown in FIG. 14. In FIG. 14, processing steps that are the same as those shown in FIG. 8 are given the same reference numerals, and a description of the processing steps will be omitted.

In step S1409, the CPU 101 estimates the amount of noise in each pixel that constitutes the patch of interest (the set of similar image patches). The noise amount estimation process performed in step S1409 will be described later in detail.

In step S1416, the CPU 101 performs a noise reduction process of STEP 2 based on the image with reduced noise generated in step S815 and the input image. The details of the noise reduction process of STEP 2 performed in step S1416 will be described later.

Details of Noise Amount Estimation Process in Step S1409

Figure 15:
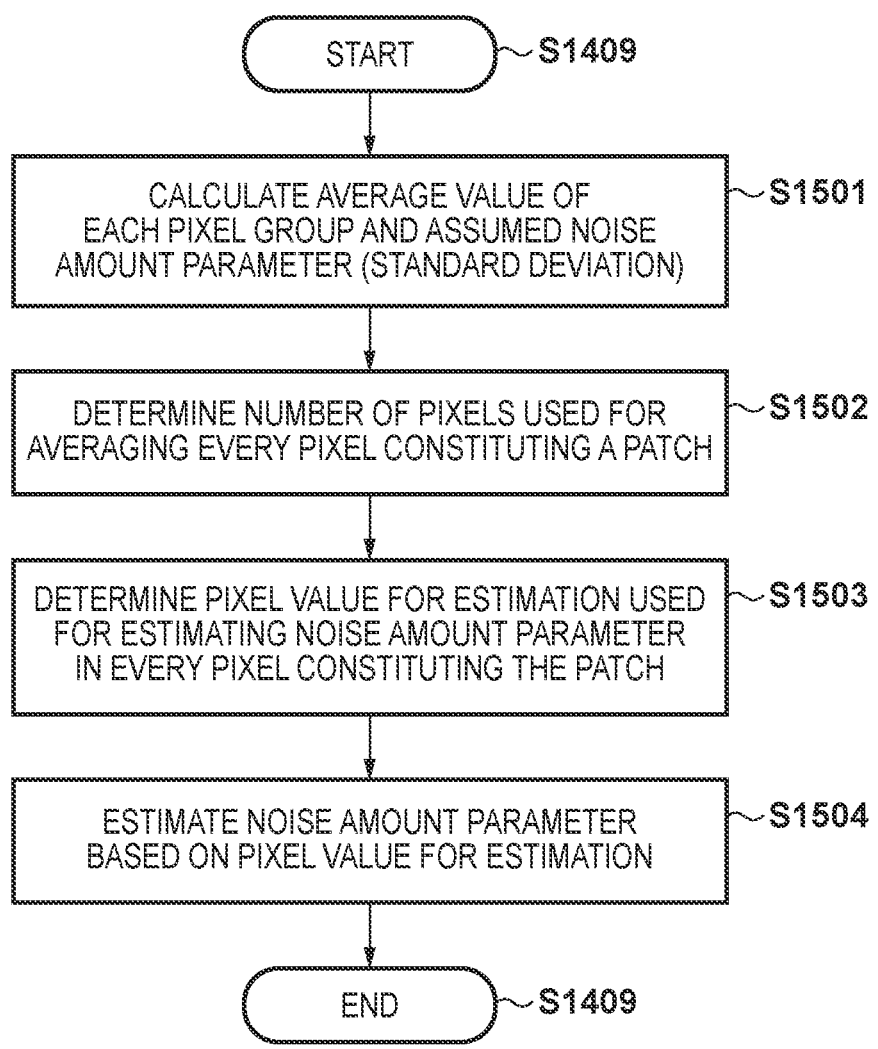
FIG. 15 is a flowchart showing the details of processing in step S1409.

The details of the process in step S1409 will be described with reference to the flowchart shown in FIG. 15. In step S1501, the CPU 101 calculates an average value of the pixel values of all patches that constitute the set of similar patches, estimates a temporary noise amount parameter using Expression (19) based on the average value, and calculates a noise standard deviation by obtaining the square root of the temporary noise amount parameter.

In step S1502, the CPU 101 determines, for each pixel that constitutes the patch, the number C of pixels used in averaging based on the SN ratio as shown in Expression (23). In step S1503, the CPU 101 calculates, for each pixel that constitutes the patch, an average value of target pixels in the patch of interest and top C reference patches in descending order of the degree of similarity to the patch of interest based on the number C of pixels determined in step S1502, and sets the obtained average value as an estimation pixel value. In step S1504, the CPU 101 estimates a noise amount parameter using Expression (19) based on the estimation pixel value calculated in step S1503.

Details of Noise Reduction Process of STEP 2 in Step S1416

The details of the processing in step S1416 will be described with reference to the flowchart shown in FIG. 16.

In step S1601, the CPU 101 initializes counters (the same as the counters in the first embodiment) corresponding to each pixel in the input image to 0.

In step S1602, the CPU 101 sets, in each of the input image and the image with reduced noise, a coordinate location of interest and reference coordinate locations in the same manner as in the first embodiment. As described above, the coordinate location of interest and the reference coordinate locations are common between the image with reduced noise and the input image.

In step S1603, the CPU 101 sets, in each of the input image and the image with reduced noise, a patch of interest and a plurality of reference patches in the same manner as in the first embodiment. The coordinate location of the patch of interest and the coordinate locations of the reference patches are common between the image with reduced noise and the input image.

In step S1604, the CPU 101 performs the following processing on each of the input image and the image with reduced noise. Specifically, the CPU 101 selects one reference patch that has not been selected (that has not been processed) from among the plurality of reference patches set in step S1603, as a selected reference patch, and calculates a degree of similarity between the patch of interest and the selected reference patch. Only the image with reduced noise is used to calculate the degree of similarity.

In step S1605, the CPU 101 determines whether or not there still is a reference patch that has not been selected as the selected reference patch in the plurality of reference patches set in step S1603. As a result of determination, if it is determined that there still is a reference patch that has not been selected as the selected reference patch in the plurality of reference patches set in step S1603, the processing returns to step S1604. On the other hand, if it is determined that there is no reference patch that has not been selected as the selected reference patch in the plurality of reference patches set in step S1603, the processing advances to step S1606.

In step S1606, the CPU 101 performs the following processing on each of the input image and the image with reduced noise. Specifically, the CPU 101 selects, from among the plurality of reference patches, top N reference patches in descending order of the degree of similarity to the patch of interest as similar patches, and generates a set of similar patches that includes the selected similar patches and the patch of interest. That is, the CPU 101 selects similar patches in the image with reduced noise and generates a set of similar patches, and also generates a set of similar patches in the input image based on the patches having coordinate values the same as those of the image with reduced noise.

In step S1607, the CPU 101 calculates an average vector of the set of similar patches generated in step S1606. In step S1608, the CPU 101 calculates a variance covariance matrix of the set of similar patches generated in step S1606. The calculation of the average vector and the variance covariance matrix is performed based on Expression (24).

In step S1609, the CPU 101 estimates the amount of noise in each pixel that constitutes the patch of interest (the set of similar patches). Specifically, as described above, a noise variance is calculated by substituting the pixel value of each pixel in the patch of interest in the image with reduced noise into Expression (19), and then expressed in the form of Expression (20) as a noise amount parameter. The pixel value that is substituted into Expression (19) is not limited to the pixel values of the patch of interest in the image with reduced noise, and may be, for example, an average value of the set of similar patches with reduced noise. Alternatively, the pixel values of the input image may be used. However, in general, it is preferable to estimate the amount of noise using the image with reduced noise.

In step S1610, the CPU 101 estimates a prior probability model based on the average vector determined in step S1607, the variance covariance matrix determined in step S1608, and the noise amount parameter determined in step S1609. Specifically, using the assumption of Expression (25), the average vector and the variance covariance matrix calculated based on the image with reduced noise obtained through the noise reduction process of 1st STEP are assumed to be the average vector and the variance covariance matrix when there is no noise.

In step S1611, the CPU 101 selects one patch that has not been selected from among the patches included in the set of similar patches in the input image, as a selected patch. Then, the CPU 101 performs a noise reduction process for reducing noise on the selected patch based on the matrix operation represented by Expression (26).

In step S1612, the CPU 101 determines whether or not all patches included in the set of similar patches have been selected as the selected patch. As a result of determination, if it is determined that all patches included in the set of similar patches have been selected as the selected patch, the processing advances to step S1613. On the other hand, if it is determined that there still is a patch that has not been selected as the selected patch in the patches included in the set of similar patches, the processing returns to step S1611.

In step S1613, the CPU 101 stores all patches (the input image) on which noise reduction has been performed in the RAM 102 or the HDD 103, and updates the counters corresponding to the pixel positions of the patches in the input image. That is, for each pixel in the input image, the number of patches that overlap the pixel is counted, and added to the counter value of the pixel.

In step S1614, the CPU 101 determines whether or not all pixels in the input image have been set as the pixel of interest in step S1602. As a result of determination, if it is determined that all pixels in the input image have been set as the pixel of interest in step S1602, the processing advances to step S1615, and if it is determined that there still remains a pixel that has not been set as the pixel of interest in the input image, the processing returns to step S1602.

At this time, not all pixels in the input image need to be set as the pixel of interest, and for example, a setting may be made such that a patch that has been used as the set of similar patches even only once is not set as the patch of interest. With this configuration, it is possible to significantly speed up the processing with little influence on the noise reduction effect in ordinary cases.

In step S1615, the CPU 101 performs aggregation based on all sets of similar patches (the input image) with reduced noise stored in the RAM 102 or the HDD 103 in step S1613 and the counters. Then, the CPU 101 outputs an image with reduced noise (an image with reduced noise of STEP 2) obtained through the processing described above. As in the first embodiment, the output destination to which the image with reduced noise of STEP 2 is output is not limited to a specific output destination.

As described above, according to the present embodiment, it is possible to highly accurately reduce noise even in a set of similar patches including a dissimilar patch. Accordingly, it is possible to highly accurately reduce noise in almost all ordinary images generated by the digital image capturing device in which the amount of noise included in each pixel is not uniform.

Third Embodiment

In the first and second embodiments, an example has been described in which the image processing apparatus 100

(900) performs a noise reduction process on an image captured by the image capturing device 105, but the noise reduction process described above as being performed by the image processing apparatus 100 (900) may be performed within the image capturing device 105. In this case, hardware for the noise reduction process described above may be provided in the image capturing device 105 so that the noise reduction process described above is performed by the hardware. Alternatively, a computer program for the noise reduction process described above may be stored in a memory of the image capturing device 105 so that the noise reduction process described above is performed by a processor of the image capturing device 105 executing the computer program. That is, the configuration of the image processing apparatus 100 (900) may be incorporated into the image capturing device 105.

Also, the image processing apparatus 100 (900) may configure a system that performs the noise reduction process on a captured image transmitted from a client apparatus via a network, and registers an image with reduced noise therein or returns the image with reduced noise to the client apparatus.

Fourth Embodiment

As described above, the output destination to which the image with reduced noise generated in the first embodiment and the image with reduced noise of STEP 2 generated in the second embodiment are output is not limited to a specific output destination. For example, the CPU 101 may display the input image, the image with reduced noise generated in the first embodiment, and the image with reduced noise of STEP 2 generated in the second embodiment simultaneously or switchably on the monitor 108. One or more of the three images may be displayed. In this case, the display method is not limited to a specific display method.

Figure 16:
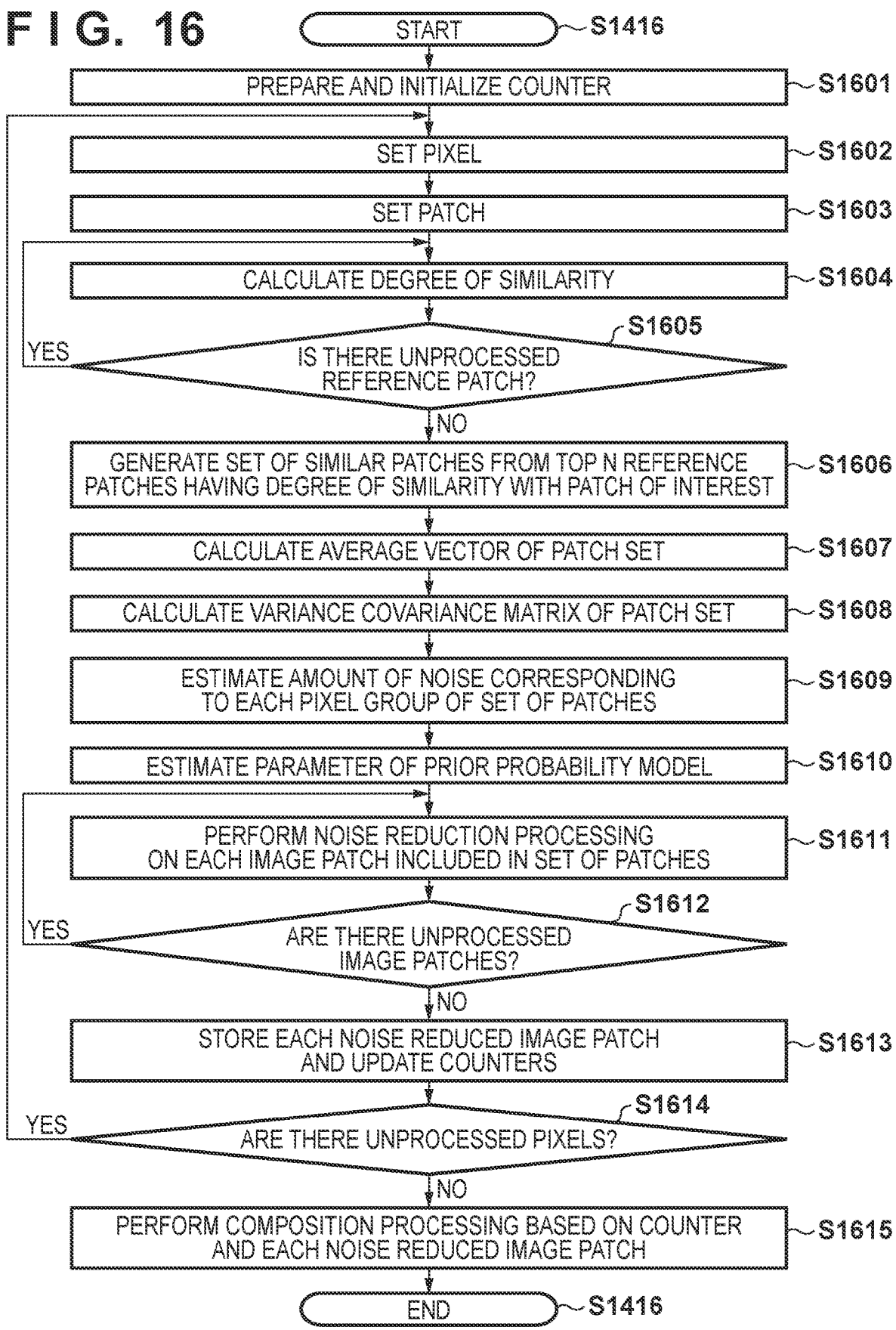
FIG. 16 is a flowchart showing the details of processing in step S1416.

Also, the CPU 101 may display, on the monitor 108, the image with reduced noise generated in the first embodiment and a screen for asking the user whether or not to execute an additional noise reduction process (the processing according to the flowchart shown in FIG. 16). In this case, if the user inputs an instruction to execute the additional noise reduction process by operating the input device 106, the CPU 101 performs the processing according to the flowchart shown in FIG. 16.

Some or all of the embodiments described above may be combined as appropriate. Also, some or all of the embodiments described above may be used selectively. Depending on the content of the processes described above, some of the processes may be performed in a processing order different from the processing order described above, or some of the processes may be performed in parallel.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-227047, filed Nov. 27, 2017, which is hereby incorporated by reference herein in its entirety.

What is claimed is:

1. An image processing apparatus comprising:
an acquiring unit that acquires a set of patches that includes a patch of interest formed of a plurality of pixels relative to a pixel of interest and a similar patch that is similar to the patch of interest in an input image;
a first estimation unit that estimates a noise amount parameter that corresponds to each pixel in the patch of interest based on a pixel value of each pixel in the patch of interest;
a first calculation unit that calculates, based on the set of patches, a covariance matrix that corresponds to the set of patches on the assumption that each pixel has a uniform noise amount parameter;
a second estimation unit that estimates, based on the covariance matrix and the noise amount parameter, a covariance matrix that corresponds to the noise amount parameter of each pixel; and
a processing unit that executes, using the covariance matrix estimated by the second estimation unit, a process of generating a first patch in which noise of at least the patch of interest among the patches included in the set of patches is reduced.

2. The image processing apparatus according to claim 1, comprising:
a composition unit that performs, based on the first patch, an aggregation process of aggregating an image whose noise is reduced with the input image.

3. The image processing apparatus according to claim 1, wherein the second estimation unit further assumes that the set of patches prior to noise being added can be modeled using a multidimensional normal distribution, and estimates, using the multidimensional normal distribution as a prior probability model, a parameter that represents the prior probability model as a prior probability parameter, and
the processing unit executes the process of generating the first patch, using the covariance matrix and the prior probability parameter estimated by the second estimation unit.

4. The image processing apparatus according to claim 3, wherein the second estimation unit estimates the prior probability parameter based on an average vector of the set of patches, a variance covariance matrix of the set of patches, and the noise amount parameter.

5. The image processing apparatus according to claim 4, wherein, where a likelihood is defined such that all noise added to the pixels that constitute each patch in the set of patches independently follows a normal distribution, the processing unit estimates a patch with reduced noise that maximizes a posterior probability of the patch before noise is added, using the Bayes' theorem based on each patch, the prior probability, the likelihood, and the noise amount parameter.

6. The image processing apparatus according to claim 5, wherein the processing unit executes the process of generating the first patch based on a calculation that is assumed to be the same as the following expression $$\operatorname*{argmax}_{P} P(P \mid \tilde{P}) = \operatorname*{argmax}_{P} P(\tilde{P} \mid P)P(P)$$
$$= \operatorname*{argmax}_{P} \exp\left(-\frac{(P-\tilde{P})^T \sum^{-1}(P-\tilde{P})}{2}\right)$$
$$\exp\left(-\frac{(P-\overline{P})^T C_P^{-1}(P-\overline{P})}{2}\right)$$
$$= \operatorname*{argmax}_{P} (P-\tilde{P})^T \sum^{-1}(P-\tilde{P}) +$$
$$(P-\overline{P})^T C_P^{-1}(P-\overline{P})$$

that maximizes the posterior probability,
where P represents a patch configured based on an original image before noise is added, $\tilde{P}$ represents a patch configured based on the input image to which noise is added by an imaging device,
Σ represents a diagonal matrix representing a noise amount parameter of each pixel constituting the patch, $C_P$ represents a variance covariance matrix of a set of patches generated from the patch configured based on the original image prior to noise being added and a similar patch that is similar to the patch configured based on the original image prior to noise being added,
the prior probability corresponds to P(P),
the likelihood corresponds to $P(\tilde{P}|P)$, and the posterior probability corresponds to $P(P|\tilde{P})$.

7. The image processing apparatus according to claim 1, wherein the acquiring unit includes:
a setting unit that sets the patch of interest and a reference patch that is formed of a plurality of pixels relative to the reference pixel for each of a plurality of reference pixels that correspond to the pixel of interest in the input image;
a calculation unit that calculates a degree of similarity between each reference patch set by the setting unit and the patch of interest; and
a selecting unit that selects a reference patch that is to be included in the set of patches as the similar patch based on the degree of similarity calculated by the calculation unit, and
the acquiring unit acquires the patch of interest and the reference patch selected by the selecting unit as the set of patches.

8. The image processing apparatus according to claim 7, wherein the selecting unit selects the reference patch that is to be included in the set of patches as the similar patch by comparing the degree of similarity calculated by the calculation unit with a specified value.

9. The image processing apparatus according to claim 7, wherein the selecting unit selects a top specified number of reference patches in descending order of the degree of similarity calculated by the calculation unit as the similar patch.

10. The image processing apparatus according to claim 1, wherein the first estimation unit estimates the noise amount parameter based on each pixel value of a patch and noise characteristics of an imaging device that captured the input image.

11. The image processing apparatus according to claim 10, wherein the first estimation unit estimates the noise amount parameter that is common between the patches included in the set of patches.

12. The image processing apparatus according to claim 10, wherein the first estimation unit includes a second calculation unit that calculates a pixel value that is used to estimate the noise amount parameter, and
the first estimation unit estimates the noise amount parameter based on the pixel value and the noise characteristics.

13. The image processing apparatus according to claim 12, wherein the second calculation unit calculates an average value of pixel values per pixel position in the set of patches.

14. The image processing apparatus according to claim 12, wherein the second calculation unit calculates a weighted average value of pixel values per corresponding pixel position in the patch of interest and one or more of reference patches in the set of patches, each of the reference patches being formed of a plurality of pixels relative to a reference pixel that correspond to the pixel of interest in the input image.

15. The image processing apparatus according to claim 14, wherein the second calculation unit calculates the weighted average value of pixel values per corresponding pixel position in the patch of interest and a top specified number of the reference patches in descending order of the degree of similarity to the patch of interest among the set of patches, and
the specified number is determined according to the amount of noise in the set of patches.

16. The image processing apparatus according to claim 1, wherein the input image is an image that includes luminance-dependent noise caused by an imaging device.

17. The image processing apparatus according to claim 2, wherein the processing unit generates, using the covariance matrix estimated by the second estimation unit, a second patch in which noise of the similar patch included in the set of patches is reduced, and the composition unit composes the first patch and the second patch.

18. The image processing apparatus according to claim 2, further comprising:
an output unit that outputs an image that is obtained through the acquiring unit, the first estimation unit, the first calculation unit, the second estimation unit, the processing unit, and the composition unit, and in which a plurality of pixels in the input image have been set as the pixel of interest, as an image with reduced noise obtained as a result of performing a noise reduction process on the input image.

19. The image processing apparatus according to claim 1, wherein the image processing apparatus is a digital image capturing device.

20. An image processing method comprising:
acquiring a set of patches that includes a patch of interest formed of a plurality of pixels relative to a pixel of interest and a similar patch that is similar to the patch of interest in an input image;
estimating a noise amount parameter that corresponds to each pixel in the patch of interest based on a pixel value of the each pixel in the patch of interest;
calculating, based on the set of patches, a covariance matrix that corresponds to the set of patches on the assumption that each pixel has a uniform noise amount parameter;
estimating, based on the covariance matrix and the noise amount parameter, a covariance matrix that corresponds to the noise amount parameter of the each pixel; and
executing, using the estimated covariance matrix, a process of generating a first patch in which noise of at least the patch of interest among the patches included in the set of patches is reduced.

21. A non-transitory computer-readable storage medium storing a computer program for causing a computer to function as:
an acquiring unit that acquires a set of patches that includes a patch of interest formed of a plurality of pixels relative to a pixel of interest and a similar patch that is similar to the patch of interest in an input image;
a first estimation unit that estimates a noise amount parameter that corresponds to each pixel in the patch of interest based on a pixel value of each pixel in the patch of interest;
a first calculation unit that calculates, based on the set of patches, a covariance matrix that corresponds to the set of patches on the assumption that each pixel has a uniform noise amount parameter;
a second estimation unit that estimates, based on the covariance matrix and the noise amount parameter, a covariance matrix that corresponds to the noise amount parameter of each pixel; and
a processing unit that executes, using the covariance matrix estimated by the second estimation unit, a process of generating a first patch in which noise of at least the patch of interest among the patches included in the set of patches is reduced.

* * * * *